US009577980B2

(12) United States Patent
Laux et al.

(10) Patent No.: US 9,577,980 B2
(45) Date of Patent: *Feb. 21, 2017

(54) SYSTEMS AND METHODS FOR TELEPHONE NUMBER PROVISIONING AND TELEPHONY MANAGEMENT

(71) Applicant: YP LLC, Tucker, GA (US)

(72) Inventors: Kent William Laux, Fremont, CA (US); Bruce Goettelman, Fenton, MO (US); Mehul Jain, Foster City, CA (US); Julie Wong, Torrance, CA (US)

(73) Assignee: YP LLC, Tucker, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,238

(22) Filed: Jun. 15, 2016

(65) Prior Publication Data

US 2016/0301662 A1    Oct. 13, 2016

Related U.S. Application Data

(63) Continuation of application No. 14/495,781, filed on Sep. 24, 2014, now Pat. No. 9,398,149.

(Continued)

(51) Int. Cl.
*H04W 24/00* (2009.01)
*H04L 29/12* (2006.01)
*H04M 15/00* (2006.01)

(52) U.S. Cl.
CPC .......... *H04L 61/605* (2013.01); *H04M 15/715* (2013.01); *H04M 15/745* (2013.01); *H04M 15/75* (2013.01); *H04M 2242/15* (2013.01)

(58) Field of Classification Search
USPC .............. 455/404.2, 405–408, 410–411, 455/456.1–456.3, 550.1, 551
See application file for complete search history.

(56) References Cited

U.S. PATENT DOCUMENTS

| | | | |
|---|---|---|---|
| 6,445,912 B1 * | 9/2002 | Cole | H04M 3/22 455/406 |
| 7,526,296 B1 | 4/2009 | Lundy et al. | |

(Continued)

OTHER PUBLICATIONS

United States Patent and Trademark Office, Notice of Allowance for U.S. Appl. No. 14/495,781, filed Mar. 14, 2016, 18 pages, U.S.A.

*Primary Examiner* — Dai A Phuong
(74) *Attorney, Agent, or Firm* — Alston & Bird LLP

(57) ABSTRACT

Systems, methods, and computer-readable media are provided for telephone number provisioning. A user interface configured to provide access to telephony information may be facilitated. The telephony information may be retained in a telephony information repository. Information about a first location may be processed. A region of interest may be determined. A set of telephony information may be processed based on the region of interest. Telephone number inventory corresponding to the region of interest may be determined based in part on the set of telephony information. Telephone number inventory may be categorized according to availability to determine a first set of telephone numbers. Local calling characteristics may be determined. Indication to the user interface of availability of telephone numbers within the region of interest based on the first set of telephone numbers and the local calling characteristics may be caused. The user interface may present graphical indicia that distinguishes the local calling characteristics.

9 Claims, 15 Drawing Sheets

Related U.S. Application Data

(60) Provisional application No. 61/881,885, filed on Sep. 24, 2013.

(56) References Cited

U.S. PATENT DOCUMENTS

| | | | | |
|---|---|---|---|---|
| 8,050,703 B2* | 11/2011 | Goto | H04W 52/286 | 455/522 |
| 8,094,798 B2* | 1/2012 | Bruce | H04M 3/51 | 379/201.12 |
| 8,243,600 B2* | 8/2012 | Zhu | H04W 72/0446 | 370/232 |
| 8,547,968 B2* | 10/2013 | Epley | H04L 29/06027 | 370/237 |
| 8,797,989 B2* | 8/2014 | Lee | H04W 74/0841 | 370/329 |
| 9,398,149 B2 | 7/2016 | Laux et al. | | |
| 2005/0208934 A1* | 9/2005 | Italia | H04M 15/00 | 455/422.1 |
| 2006/0025109 A1* | 2/2006 | Levitan | H04M 15/10 | 455/406 |
| 2009/0088153 A1 | 4/2009 | Krause et al. | | |
| 2009/0125320 A1 | 5/2009 | Bickett | | |
| 2009/0296913 A1 | 12/2009 | Thomas et al. | | |
| 2010/0054169 A1* | 3/2010 | Zhu | H04W 72/0446 | 370/315 |
| 2012/0134285 A1* | 5/2012 | Mikami | H04L 1/0009 | 370/252 |
| 2014/0114793 A1 | 4/2014 | Silver | | |
| 2014/0248852 A1 | 9/2014 | Raleigh et al. | | |
| 2014/0376389 A1 | 12/2014 | Cocoran et al. | | |
| 2015/0046214 A1 | 2/2015 | Jain et al. | | |
| 2015/0087281 A1 | 3/2015 | Laux et al. | | |
| 2016/0021575 A1* | 1/2016 | Dziyauddin | H04W 52/267 | 370/311 |
| 2016/0050316 A1 | 2/2016 | Jain et al. | | |

* cited by examiner

FIG. 8

SYSTEMS AND METHODS FOR TELEPHONE NUMBER PROVISIONING AND TELEPHONY MANAGEMENT

CROSS-REFERENCES TO RELATED APPLICATIONS

This application claims the benefit of U.S. Provisional Patent Application No. 61/881,885, filed Sep. 24, 2013, entitled "SYSTEMS AND METHODS FOR TELEPHONE NUMBER PROVISIONING AND TELEPHONY INFORMATION MANAGEMENT," and is a continuation of U.S. application Ser. No. 14/495,781, filed Sep. 24, 2014, the content of both of which are hereby incorporated by reference for all purposes.

COPYRIGHT

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE DISCLOSURE

The present disclosure relates in general to telephony, and, more specifically, but not by way of limitation, to systems and methods for telephone number provisioning and telephony management.

Previously, provisioning of telephone numbers often has involved a significant time, effort, and hassle, including a manual process involving the filling out of forms and various inconveniences associated with working with a phone number vendor. For example, a member of a sales department of a business entity requiring phone numbers could have been required to fill out forms and send the forms to others that would need to go to a telephony vendor site, provide information to the vendor, and secure phone numbers. Information supplied to a vendor may well have included internal information, such as customer ID, customer name, address, telephone directory with which the customer is associated, product which the customer bought, etc. The vendor may well have supplied all the reporting based on the information that was provided to the vendor. Such provisioning has entailed significant hassle and undesirable information sharing.

Additionally, with respect to phone numbers being assigned to particular end-users, there have been problems associated with the phone number assignments. For example, when obtaining a new mobile phone number, a subscriber may be given multiple number options, but the subscriber may not know if the numbers correspond to the subscriber's current city or a neighboring city. The subscriber may choose a number that does not match the current city, and, when the subscriber places calls from the number, the caller ID on the receiving end may incorrectly indicate the subscriber's city.

Thus, there is a need for solutions to problems associated with obtaining and provisioning telephone numbers.

BRIEF DESCRIPTION OF THE DRAWINGS

The present disclosure is described in conjunction with the appended figures.

FIGS. 3 through 8 depict screenshots illustrating example interfaces and features for telephone number provisioning and/or telephony information management, in accordance with certain embodiments of the present disclosure.

Figure 1:
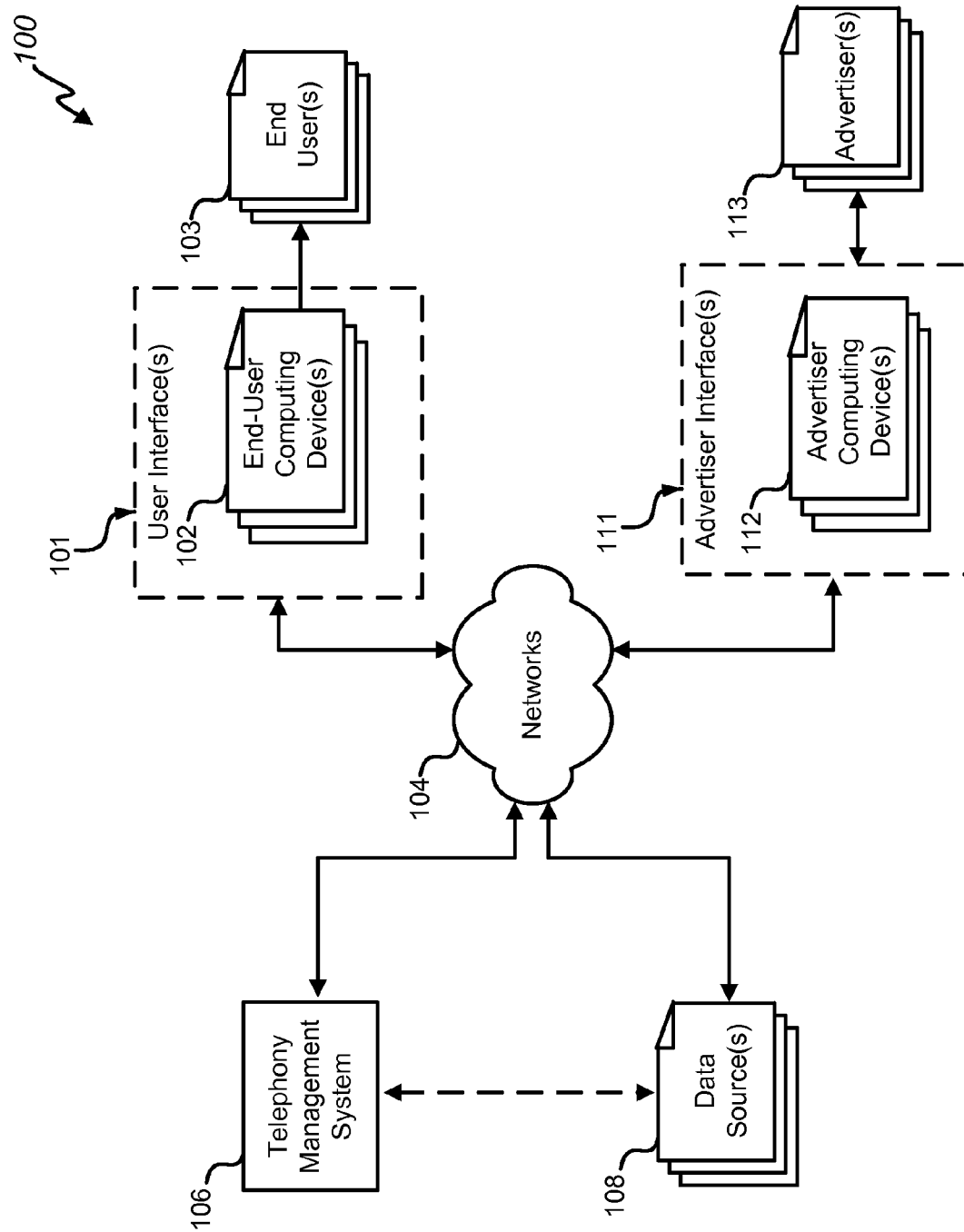
FIG. 1 depicts a high-level block diagram of a system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

BRIEF SUMMARY

Certain embodiments of the present disclosure relate in general to telephony, and, more specifically, but not by way of limitation, to systems and methods for telephone number provisioning and telephony management.

In one aspect, method for telephone number provisioning is disclosed. The method may include one or a combination of the following, which may be performed via a telephony management system. A user interface configured to provide access to telephony information may be facilitated. At least some of the telephony information may be retained in a telephony information repository. Information about a first location specified for an entity and/or an individual may be processed. A region of interest may be determined based at least in part on the first location. A set of telephony information retained in the telephony information repository may be processed based at least in part on the region of interest. Telephone number inventory corresponding to the region of interest may be determined based at least in part on the set of telephony information. The determining the telephone number inventory may include categorizing at least some of the telephone number inventory according to availability of telephone numbers to determine a first set of telephone numbers, the first set of telephone numbers being available for assignment. Local calling characteristics of the first set of telephone numbers may be determined. Indication to the user interface of availability of telephone numbers for assignment within the region of interest based at least in part on the first set of telephone numbers and the local calling characteristics of the first set of telephone numbers may be caused. The user interface may present graphical indicia that distinguishes the local calling characteristics of the first set of telephone numbers.

In another aspect, a system for telephone number provisioning is disclosed. One or more network interfaces may be configured to provide access to one or more networks. One or more processors may be coupled to the one or more network interfaces, the one or more processors to execute instructions to perform one or a combination of the following. A user interface configured to provide access to telephony information may be facilitated. At least some of the telephony information may be retained in a telephony information repository. Information about a first location specified for an entity and/or an individual may be processed. A region of interest may be determined based at least in part on the first location. A set of telephony information retained in the telephony information repository may be processed based at least in part on the region of interest. Telephone number inventory corresponding to the region of interest may be determined based at least in part on the set of telephony information. The determining the telephone number inventory may include categorizing at least some of the telephone number inventory according to availability of telephone numbers to determine a first set of telephone numbers, the first set of telephone numbers being available for assignment. Local calling characteristics of the first set of telephone numbers may be determined. Indication to the user interface of availability of telephone numbers for assignment within the region of interest based at least in part on the first set of telephone numbers and the local calling characteristics of the first set of telephone numbers may be caused. The user interface may present graphical indicia that distinguishes the local calling characteristics of the first set of telephone numbers. One or more storage media may be coupled to the one or more processors to retain the instructions.

In yet another aspect, one or more non-transitory, machine-readable media are provided. The one or more non-transitory, machine-readable media have machine-readable instructions thereon which, when executed by one or more processing devices, may cause the one or more processing devices to perform one or a combination of the following. A user interface configured to provide access to telephony information may be facilitated. At least some of the telephony information may be retained in a telephony information repository. Information about a first location specified for an entity and/or an individual may be processed. A region of interest may be determined based at least in part on the first location. A set of telephony information retained in the telephony information repository may be processed based at least in part on the region of interest. Telephone number inventory corresponding to the region of interest may be determined based at least in part on the set of telephony information. The determining the telephone number inventory may include categorizing at least some of the telephone number inventory according to availability of telephone numbers to determine a first set of telephone numbers, the first set of telephone numbers being available for assignment. Local calling characteristics of the first set of telephone numbers may be determined. Indication to the user interface of availability of telephone numbers for assignment within the region of interest based at least in part on the first set of telephone numbers and the local calling characteristics of the first set of telephone numbers may be caused. The user interface may present graphical indicia that distinguishes the local calling characteristics of the first set of telephone numbers.

In various embodiments, one or more of the telephone numbers may be identified based at least in part on a user selection. The one or more of the telephone numbers may be assigned to the entity and/or the individual. In various embodiments, the entity and/or the individual and the information about the first location correspond to a business. In various embodiments, the information about the first location may be based at least in part on first user input responsive to a first set of one or more user-selectable options being presented via the user interface. In various embodiments, one or more rate centers corresponding to the region of interest may be identified based at least in part on the set of telephony information. The determining the telephone number inventory may include determining the telephone number inventory with respect to at least one of the one or more rate centers.

In various embodiments, target information corresponding to the region of interest may be processed. The target information may specify a target rate center. The determining the local calling characteristics of the first set of telephone numbers may be based at least in part on using the target rate center as a point of reference. In various embodiments, the target information may be derived from second user input responsive to a second set of one or more user-selectable options being presented via the user interface and/or a profile for the entity.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example without limitation, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Over time, a number of idiosyncrasies and complexities have built up relating to number provisioning, advertiser requirements, service areas, call centers, and the like. Certain embodiments according to the present disclosure may provide visibility, simplification, and understandability of the complex inter-workings relating to number provisioning. Certain embodiments may provide for a visual and interactive way to choose phone numbers based on geography. Certain embodiments may graphically indicate which telephone numbers are available (e.g., not already assigned to one or more individuals or entities) and where which of various available telephone numbers (and unavailable numbers, in some embodiments) correspond to various areas throughout the city and/or other geographical region. Using a visual interface, a user may select a set of one or more numbers that the user would like to use. For example, an embodiment could provide a user with an option to choose whether he wants a number closer to San Jose or Santa Clara. In some embodiments, the numbers could be virtual numbers that are representative of each of the localities. A user could be presented with a map interface in some embodiments. The map interface may present, for example, a metro area that indicates which numbers are available and where which of various numbers correspond to various areas throughout the city. Various embodiments may graphically indicate various information about areas, area codes, rate centers, cities, states, zip codes, addresses, etc.

In some embodiments, a user could correspond to an advertiser that wants to target specific localities with locality representative numbers. In some embodiments, a user could correspond to a representative of an entity that provides telephone numbers to other entities and/or end users, and/or facilitates the selection of telephone numbers by other entities and/or end users. In some embodiments, a user could correspond to a consumer wishing to select a particular number, for example, via a website or other interface of a telecommunications company.

Any suitable region of interest may be a point of reference for determining available numbers and/or local/toll charge boundaries for the numbers. In the case of users being advertisers, a region of interest could be one in which a given merchant wishes to advertise and/or conduct business. In some cases, it may be desirable to have a local number in an area remote from a particular locality. Say, for example, that an advertiser located in Detroit wishes to target customers in Madison, Wis., and desires a number that is local for certain areas of Madison; certain embodiments may facilitate such targeted telephone number selection. In the case of users being consumers, a region of interest could be any region in which a consumer desires the ability to make local phone calls. A region of interest could be any region with which a consumer wishes to associate, for example, so that calls placed by the consumer may be indicated (say, on the callee's telephone) as originating from a particular area.

In some embodiments, a region of interest may be based at least in part on service area. This may allow number provisioning to be targeted by metro area that may be divided according to directory distribution area. Thus, for example, a region of interest, and, accordingly, which numbers may be selected, may be determined in view of whether an advertiser or another end-user resides with respect to one or more service area footprints. Each telephone directory typically has a certain distribution footprint corresponding to one or more certain zip codes, street addresses, etc.

Certain embodiments may provide for an interface that may only be used in a read-only mode. For example, a mobile phone service vendor may provide a consumer interface to be used by customers at a store; the consumer interface could allow a customer to navigate through different parts of a particular metro area to identify various available telephone numbers associated with various geographical areas. In some embodiments, the consumer interface could allow the customer to select a desired number. Say, a customer wanted to have a number associated with the west side of Denver; the customer could use the consumer interface to identify which numbers are available for that particular area, and select a particular number out of those which are available.

Customer service and complaint issues may be addressed more readily and/or more effectively with certain embodiments. Say, for example, an advertiser who has been assigned a telephone number contacts the provider with an issue, thinking that the telephone number was a long-distance number with respect to a certain area; a representative of the provider may readily examine the number with this tool and quickly determine whether or not the advertiser is correct. Thus, certain embodiments may provide a tool that allows for quick and easy confirmation of phone number information. A representative of the provider can quickly confirm and show the advertiser the number that was given, the location of the advertiser, and whether the number is a local number for the advertiser's business.

Certain embodiments may provide a research and/or administration tool. For example, the tool can provide visibility into inventories for specific regions and/or use characteristics for specific regions, thus allowing for planning, remedial actions, and/or growth actions to be well focused. Research/administration tool features could be made available for use by an entity that provides telephone numbers to other entities and/or end users, and/or facilitates the selection of telephone numbers by other entities and/or end users. In some embodiments, in addition or in alternative, research features could be exposed to advertisers, for example, via an advertising platform.

Certain embodiments may also allow for capture of additional telephone numbers from one or more third party carriers, for example, in cases where specific numbers are not available and/or where inventory is insufficient for a specific region. Certain embodiments may provide the capability to allow for ordering additional phone number inventory from one or more suppliers. Inventory levels may be determined by rate center, local calling area, and/or area code, and orders for additional inventory may be placed via one or more user-selectable options via a user interface (e.g., via a map interface).

Various embodiments will now be discussed in greater detail with reference to the accompanying figures, beginning with FIG. 1.

FIG. 1 depicts a high-level block diagram of a system 100, in accordance with certain embodiments of the present disclosure. The system 100 allows for interaction between two or more of end-user portal interface(s) 101, end-user computing device(s) 102, end user(s) 103, a telephony management system 106, data source(s) 108, advertiser(s) 113, advertiser portal interface(s) 111, advertiser communication device(s) 112. As depicted, various elements of the system 100 may be communicatively coupled or couplable to one or more networks 104.

The one or more networks 104 may be any suitable means to facilitate data transfer in the system 100. In various embodiments, the one or more networks 104 may be implemented with, without limitation, one or more of the Internet, a wide area network (WAN), a local area network (LAN), a wireless local area network (WLAN), a metropolitan area network (MAN), a cellular network, such as through 4G, 3G, GSM, CDMA (code division multiple access), etc., another wireless network, a gateway, a public switched telephone network (PSTN), or any other appropriate architecture or system that facilitates the communication of signals, data, and/or messages. In various embodiments, the one or more networks 104 may transmit data using any suitable communication protocol(s). In various embodiments, the one or more networks 104 and the various components thereof may be implemented using hardware, software, and communications media such wires, optical fibers, microwaves, radio waves, and other electromagnetic and/or optical carriers; and/or any combination of the foregoing and/or the like. The end-user computing device(s) 102, end user(s) 103, advertiser(s) 113, telephony management system 106, and/or data source(s) 108 may be communicatively coupled or couplable to the one or more networks 104 via any suitable communication paths that support the communication protocol(s) used in the various embodiments.

The telephony management system 106 may facilitate searching of one or more information repositories in response to information received over the one or more networks 104 from the end-user computing devices 102. In various embodiments, the telephony management system 106 may include any device or set of devices configured to process, send, receive, retrieve, detect, generate, compute, organize, categorize, qualify, store, display, present, handle, or use any form of information or data suitable for the embodiments described herein. Certain embodiments according to the present disclosure may implement a call cloud to facilitate telephone number provisioning and various embodiments disclosed herein. The call cloud may be implemented by and/or with the telephony management system 106.

The telephony management system 106 may include a single computing device or multiple computing devices, which may be implemented in or with a distributed computing and/or cloud computing environment, that provide features of various embodiments disclosed. The telephony management system 106 may include one or more processing resources communicatively coupled to one or more storage media, random access memory (RAM), read-only memory (ROM), and/or other types of memory. The telephony management system 106 may include any one or combination of various input and output (I/O) devices, network ports, and display devices.

In certain embodiments, the telephony management system 106 may be communicatively coupled or couplable to one or more data sources 108. The one or more data sources 108 may include any suitable source of data. In various embodiments, the one or more data sources 108 may include one or more of a database, a website, any repository of data in any suitable form, and/or a third party. With certain embodiments, the one or more data sources 108 may include one or more providers of mapping and/or other types of location information that may be used to facilitate various embodiments disclosed herein. In certain embodiments, the one or more data sources 108 may include one or more metadata sources that provide metadata to facilitate various embodiments disclosed herein. The one or more data sources 108 may include one or more vendors or other suppliers of telephone numbers and/or telephony information, which may include metadata (e.g., telephony metadata pertaining to certain rate centers).

In some cases, one or more rate centers could be assigned to a directory and/or vice versa. Metadata associated with certain rate centers may be used to define a footprint of a book—i.e., which rate centers, which phone numbers are within a directory area, and which in are within other areas. A rate center may refer to a geographical area which is served by a particular switch or set of switches. The rate center may have a central office code that corresponds to a three number prefix.

In some embodiments, metadata that pertains to a registry of telephony rate centers around a country/region may be gathered. In some embodiments, metadata may be provided by one or more third-party data sources 108. Such a third-party data source 108 could provide metadata updates, for example, on a periodic basis and/or when pulled by the telephony management system 108. The metadata could be provided as a non-premise solution such that information internal to a telephony management system 106 need not be shared with the third-party data source 108. In some embodiments, metadata may be gathered by the telephony management system 106. The metadata may be multi-dimensional. When a call is placed, the call may be placed through rate centers, the call may be logged such that call detail records are formed, which records may indicate when the call was placed, an originating number, a terminating number, a phone service provider providing service to the caller—such information may be used to determine one or more rates that may be charged. Rate centers, and/or information associated therewith, may be used by local exchanges, carriers, and telephone companies in general to determine toll charges of calls between particular locations. In some embodiments, metadata may be used to determine which numbers correspond to a certain area and/or a rate center. Certain embodiments may use metadata to help with phone number selection. Alternatively or additionally, certain embodiments may use internal phone number inventory information to help with phone number selection.

As previously discussed, in the past, provisioning of telephone numbers often has involved a manual process involving the filling out of forms and various inconveniences associated with working with a phone number vendor 108. Certain embodiments may allow for elimination or minimization of a need to work with a vendor or other supplier 108. Certain embodiments may allow for limited sharing of information with a vendor or other supplier 108 in instances where such interaction with the vendor/supplier 108 is necessary, for example, to obtain additional inventory and/or to obtain metadata. In certain embodiments, a number could be secured from a vendor/supplier 108 via one or more application programming interfaces (APIs) without sharing internal information. For example, information sharing may be limited to specifying a type of number desired (such as a toll-free number) and specifying regional information corresponding to a region of interest. In some embodiments, the information shared may include an advertiser's number, such as the 10-digit phone number which may be known as a ring-to or ring-to number, without specifying further information such as the advertiser's name. The vendor/supplier 108 may return a 10-digit phone number that is a call-tracking number that meets the specified number type and specified regional criteria, or the vendor/supplier 108 may indicate that the request cannot be satisfied, for example, when no inventory is available. However, certain embodiments may allow for internal telephone number allocation such that an outside vendor/supplier is not needed.

With some embodiments, the data sources 108 may include one or more mobile computing device locator services that provide information regarding the location of one or more end-user computing devices 102. With some embodiments, certain of the data sources 108 may provide various details relating to call data. With some embodiments, certain of the data sources 108 may provide caller name information from calling name delivery (CNAM), also known as caller identification or caller ID, may be used to determine particular details about the caller. With some embodiments, certain of the data sources 108 may provide information about the area of a caller. With some embodiments, certain of the data sources 108 may provide demographic data about an area.

In various embodiments, the data from the one or more data sources 108 may be retrieved and/or received by the telephony management system 106 via the network 104 and/or through any other suitable means of transferring data. For example, in some embodiments, the telephony management system 106 and the data sources 108 could use any suitable means for direct communication, as depicted. According to certain embodiments, data may be actively gathered and/or pulled from one or more data sources 108, for example, by accessing a third party repository and/or by "crawling" various repositories. In some embodiments, data may be actively gathered and/or pulled from one or more data sources 108 on an as-needed basis, such as in real time responsive to user requests disclosed herein. Such real-time data acquisition could be used to supplement data already retained by the telephony management system 106. The data pulled and/or pushed from the one or more data sources 108 may be made available by the telephony management system 106 for user(s) 103 of the end-user computing devices 102. In alternative embodiments, data from the one or more data sources 108 may be made available directly to the end-user computing devices 102.

According to certain embodiments, the telephony management system 106 may be, include, or otherwise facilitate an advertising platform. In some embodiments, the advertiser(s) 113 may access the telephony management system 106 via advertiser interface(s) 111. In various embodiments, the advertiser interface(s) 111 may include any suitable input/output module or other system/device operable to serve as an interface between the advertiser(s) 113 and the advertising platform. In some embodiments, an advertiser interface 111 may include one or more APIs. In some embodiments, an advertiser interface 111 may include a web interface. The advertiser interface 111 may cause a web page to be displayed on a browser of an advertiser 113. The advertiser interface 111 may allow for transfer of and access to telephony and/or advertising information in accordance with certain embodiments disclosed herein. Accordingly, the telephony management system 106 may have web site/portals giving access to such information. The advertiser interface(s) 111 may facilitate communication over the one or more networks 104 using any suitable transmission protocol and/or standard. In some embodiments, the telephony management system 106 may include and/or provide the advertiser interface(s) 111, for example, by making available one or more of a website, a web page, a web portal, a web application, a thin-client application, a rich-client application, a mobile application, enterprise software, and/or any suitable application software.

In certain embodiments, an advertiser interface 111 may include one or more advertiser computing devices 112. In certain embodiments, the one or more advertiser computing devices 112 may include a mobile computing device that may be any portable device suitable for sending and receiving information over a network in accordance with embodiments described herein. For example without limitation, in various embodiments, the advertiser computing devices 112 may include one or more devices variously referenced as a mobile phone, a cellular telephone, a smartphone, a handheld mobile device, a tablet computer, a phablet, a smartwatch, smartglasses, a web pad, a personal digital assistant (PDA), a notebook computer, a handheld computer, a laptop computer, and/or the like.

According to certain embodiments, the telephony management system 106 may be, include, or otherwise facilitate a remote user platform. In various embodiments, the end user(s) 103 may access the telephony management system 106 via end-user interface(s) 101. Similar to the advertiser interface(s) 111, in various embodiments, the end-user interface(s) 101 may include any suitable one or combination of modules, system/devices, APIs, web interfaces, and/or the like to provide one or more types of interfaces for various types of users 103 in accordance with various embodiments. The end-user interface(s) 101 may facilitate communication over the one or more networks 104 using any suitable transmission protocol and/or standard. In some embodiments, the telephony management system 106 may include and/or provide the end-user interface(s) 101, for example, by making available one or more of a website, a web page, a web portal, a web application, a mobile application, enterprise software, and/or any suitable application software.

Figure 2:
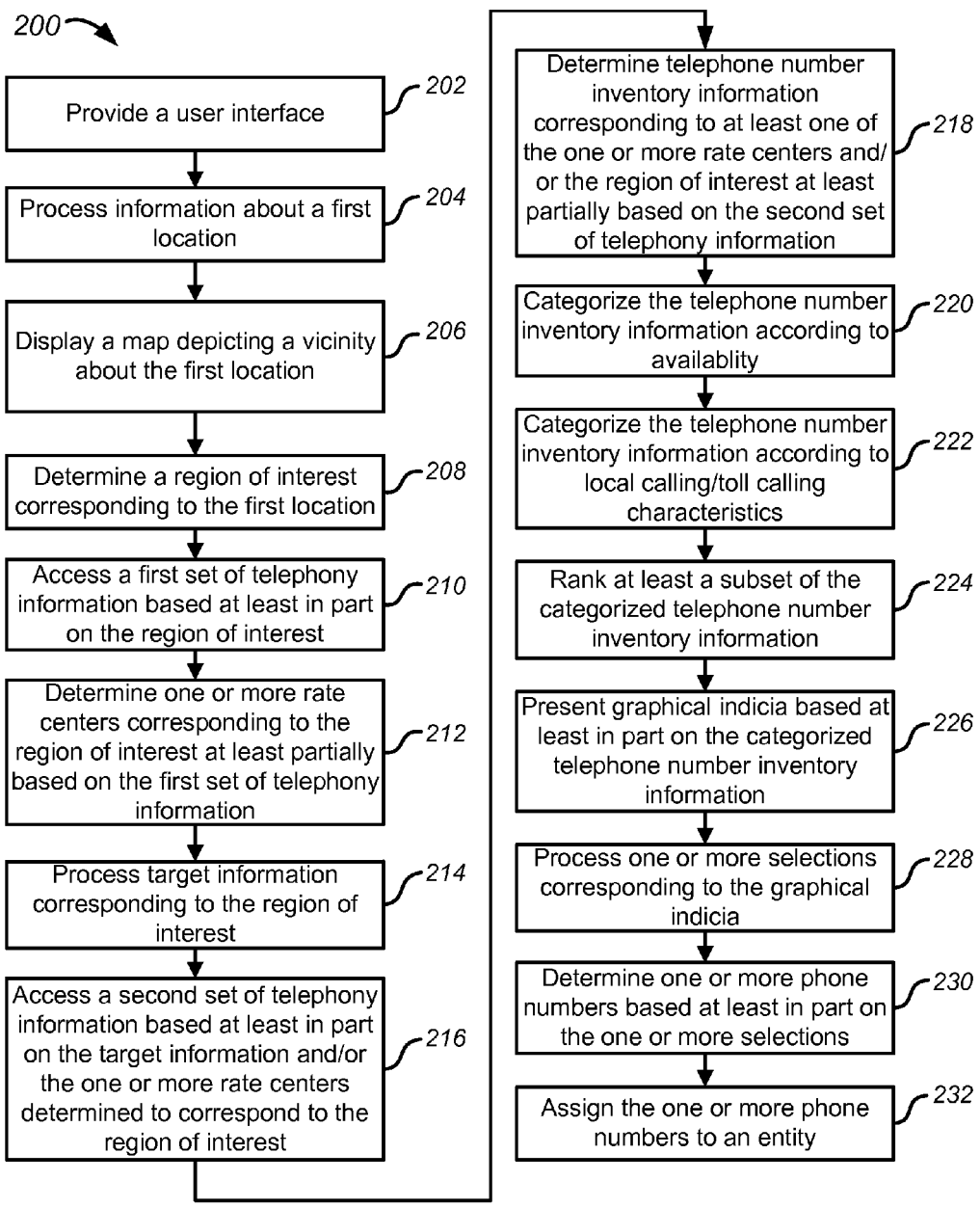
FIG. 2 depicts an example method of telephone number provisioning, in accordance with certain embodiments of the present disclosure.

FIG. 2 illustrates an example method 200 of telephone number provisioning, in accordance with certain embodiments of the present disclosure. Teachings of the present disclosure may be implemented in a variety of configurations that may correspond to one or more of the systems disclosed herein. As such, certain steps of the method 200, and the other methods disclosed herein, may be omitted, and the order of the steps may be shuffled in any suitable manner and may depend on the implementation chosen. Moreover, while the following steps of the method 200, and those of the other methods disclosed herein, may be separated for the sake of description, it should be understood that certain steps may be performed simultaneously or substantially simultaneously.

According to some embodiments, the method 200 may begin as indicated by block 202. As indicated by block 202, a user interface may be provided. In various embodiments, a user interface may correspond to one or more interfaces 101 and/or 111. In various embodiments, a user interface may include providing one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, maps, hyperlinks, buttons, lists, combo boxes, checkboxes, radio buttons, and/or the like.

In some embodiments, the user interface may be configured to provide features to a user that corresponds to an agent/representative of an entity that provides telephone numbers to other entities and/or end users, and/or facilitates the selection of telephone numbers by other entities and/or end users. In some embodiments, the user interface may be configured to provide features to a user that corresponds to an advertiser, for example, via an advertising platform. In some embodiments, the user interface may be provided to an advertiser as part of a provider onboarding and analysis process that creates a provider profile. For example, the user interface may be provided to an advertiser as part of the provider onboarding and analysis according to embodiments disclosed in U.S. patent application Ser. No. 14/458,080, filed Aug. 12, 2014 (entitled Systems and Methods for Lead Routing, by Jain et al.), which is hereby incorporated by reference for all purposes.

In some embodiments, the user interface may be configured to provide features to a user that corresponds to a consumer, for example, one interested in selecting a particular number individually and/or via an interface of a telecommunications company. In some embodiments, a user interface may be provided via a website, API, and/or a mobile application configured to run on a user's mobile computing device. For example, the mobile application could be made available from the telephony management system or any website for download to the mobile computing device; alternatively, it may be pre-installed on the mobile computing device and stored in the device's memory and/or computer-readable media.

As indicated by block 204, information about a first location may be processed. As discussed herein, one or more user-selectable options for selecting a geographical area of interest may be provided, and corresponding user selection of search criteria may indicate a first location. By way of example without limitation, a user may identify any suitable location by indicate location information that may be in the form of an address, a partial address, a city, a zip code, latitude and/or longitude coordinates, a location keyword, any suitable location-indicating information, map manipulation, such as panning, zooming, a selection window, and/or the like.

In some embodiments, information about a first location may be determined automatically via GPS coordinates, cellular tower triangulation techniques, Wi-Fi-based location information, carrier-provided location information, and/or other location determination systems. For example, a location engine of the system may identify a location of the computing device 102, 112. In some embodiments, the location information may be determined from the provider profile. In some embodiments, a location corresponding to an advertiser or individual may be determined automatically as part of generating a recommendation for the advertiser or individual.

As indicated by block 206, in some embodiments, a map depicting a vicinity about the first location may be displayed. As discussed herein, additionally or alternatively, a non-map format may be presented to represent information corresponding to a vicinity about the first location and/or any other information that may be conveyed via a map display in accordance with various embodiments. For example, such information may be conveyed in a list format, As indicated by block 208, in some embodiments, a region of interest corresponding to the first location may be determined. The region of interest may correspond to a vicinity about the first location. In some embodiments, a region of interest may correspond to predefined areas for various locations. For example, if the first location corresponds to St. Louis, a predefined region of interest based on the St. Louis metro area may be identified. The predefined region of interest could encompass the St. Louis metro area and could be associated with a first location indicative of St. Louis generally and/or specifically.

In some embodiments, a region of interest may be based at least in part on a scope of the map that is displayed after the user has manipulated the map interface to display a particular area. The region of interest could be based at least in part on the extent of the area displayed with the map interface. Additionally or alternatively, the region of interest could be based at least in part on a portion of the area displayed with a map interface, such as, for example, a portion (e.g., a circular area or any other shape of area) encompassing a center point of the area displayed. In some embodiments, determining a region of interest corresponding to the first location may include determining coordinates, such as latitudinal and longitudinal coordinates corresponding to the first location. In some embodiments, the coordinates determined may define or otherwise indicate the region of interest.

As indicated by block 210, in some embodiments, a first set of telephony information may be accessed based at least in part on the region of interest. The first set of telephony information may be gathered from one or more telephony information repositories. In some embodiments, the first set of telephony information may include and/or be derived from metadata discussed herein. In some embodiments, at least some of the metadata may be pulled from a data source as needed, responsive to user input via the user interface. In some embodiments, such metadata may be pulled from a data source as a check for updates/additional data that may be used to update/supplement data in one or more telephony information repositories As indicated by block 212, in some embodiments, one or more rate centers corresponding to the region of interest may be determined at least partially based on the first set of telephony information. Accordingly, in some embodiments, one or more rate centers may be determined to be located within the coordinates of the region of interest.

As indicated by block 214, in some embodiments, target information corresponding to the region of interest may be processed. In some embodiments, the target information may specify one or more rates centers. The specified one or more rate centers may be used as a point of reference for determining inventory associated with the rate centers. The specified one or more rate centers may be used as a point of reference for determining local and/or toll calling characteristics with respect to telephone numbers associated with the rate centers.

In some embodiments, target information may be derived from a user selection. For example, a user may select a particular rate center of interest. The selection may be facilitated by the presentation of a user-selectable option corresponding to a graphical indication of the rate center, as discussed further herein. In some embodiments, the selection may be made by text entry into a field presented for selection.

In some embodiments, target information may be identified automatically. For example, target information could be identified based at least in part on the first location. As one example, a rate center located near the first location could be identified as a target. Say, for example, the user has manipulated the map interface to display a particular region of interest corresponding to the first location; a rate center located near a center point of the region of interest display could be automatically identified as a target.

In some embodiments, target information may be identified automatically as part of generating a recommendation for an advertiser. For example, a rate center located near a business site of the advertiser could be identified as a target. The business site of the advertiser could be determined from the provider profile in some embodiments. As another example, a rate center located in and/or near an area of activity pertinent to the particular business of the provider could be identified as a target. The provider may be matched to a particular business category. For example, call information for a particular area may be analyzed to determine if a threshold number of calls have been made to plumbers, or businesses relating to particular business category (e.g., plumbing), within a given time period. If so, this could be taken as an indication that the area may be a recommended target market for the particular business, and one or more rate centers located in and/or near the target market could be identified as a target(s). Area information, including demographics for particular areas, may be analyzed to determine whether an area may be a recommended target market for the particular business based on the matched business category and lead information that indicates that the area information, such as demographics, matches the business category.

As indicated by block 216, in some embodiments, a second set of telephony information may be accessed. In some embodiments, the second set of telephony information may be accessed based at least in part on the target information and/or the one or more rate centers determined to correspond to the region of interest. Like the first set of telephony information, the second set of telephony information may be gathered from one or more telephony information repositories. And, like the first set of telephony information, in some embodiments, the second set of telephony information may include and/or be derived from metadata discussed herein. In some embodiments, the second set of telephony information may be a subset of the first set of telephony information.

As indicated by block 218, in some embodiments, telephone number inventory information corresponding to at least one of the one or more rate centers and/or the region of interest may be determined at least partially based on the second set of telephony information. Telephone number inventory information may correspond to the one or more rate centers relating to the region of interest. Telephone number inventory information may include or indicate available telephone numbers, telephone numbers in use or otherwise unavailable, inventory characteristics, such as a lack of inventory, available capacity, and/or the like, and/or any other suitable information.

As indicated by block 220, in some embodiments, the telephone number inventory information may be categorized according to availability if such categorization has not already been performed by the telephony management system. The categorization may be based at least in part on each rate center, and may include determining telephone number inventories for each rate center, determining telephone numbers available, determining totals available numbers, categorizing available and/or unavailable numbers (e.g., according to portions of telephone numbers such as area code and prefix), and/or the like.

As indicated by block 222, in some embodiments, the telephone number inventory information may be categorized according to local calling/toll calling characteristics if such categorization has not already been performed by the telephony management system. In numerous cases, it may be desirable to provide available phone numbers that allow for local calling (non-toll-charge calling) for one or more regions of interest. Say a region of interest is San Antonio, or a specific area in or around San Antonio, it may be desirable to determine which numbers are available in the particular San Antonio area, and which are local to a particular user and/or reference point. The categorization may be based at least in part on the target information. Say, for example, a target corresponds to a particular rate center of interest; a local calling area, local telephone numbers, and/or one or more rate centers associated therewith may be determined with respect to the particular rate center.

As indicated by block 224, in some embodiments, at least a subset of the categorized telephone number inventory information may be ranked. For example, with respect to a targeted rate center, available and/or unavailable telephone numbers may be ranked according to quantities, extent of usage, particular characteristics of the localities to which the numbers pertain, and/or any other suitable basis. In some embodiments, such bases may include one or more of a characterization of the numbers as being more or less easy to remember, such as repetition of numbers, a natural and/or intuitive sequence of numbers, a relation to popular or well-known number sequences (e.g., historical dates), a relation to alphabetical characters (e.g., a relation such as a cognitive word(s), word portion(s), acronyms), and/or the like. In some embodiments, numbers may be ranked based at least in part on call count information of past calls. For example, count information of past calls to a particular number may be used by the system to score the particular number's popularity. Greater thresholds of count information of past calls to a particular number may correspond to increased scores. The higher counts could be correlated to ease of remembering particular numbers.

In some embodiments, the categorized telephone number inventory information may be ranked in view of a particular advertiser in order to determine a recommendation for the particular advertiser. In some embodiments, telephone numbers may be scored and ranked according to relevance to a provider category associated with the particular advertiser. For example, an available number with a relation to a cognitive word (e.g., (xxx) DEN-TIST) may be scored and ranked as highly relevant to a provider category for dentists, but not scored and ranked as highly relevant to certain other categories. In some embodiments, a number that was previously assigned to an advertiser corresponding to a particular category could be deemed as more relevant to a subsequent advertiser in the same category. For example, consumers used to calling particular numbers for particular categories of products/services may continue calling the same numbers for the same needs, and this aspect may be reflected in the relevancy score.

Number analysis could take into any one or combination of bases disclosed herein relating to the previous activity associated with particular numbers, callers having call the particular numbers, businesses previously assigned particular numbers, information about the areas associated with particular numbers, and/or the like. Such factors could be scored and number options could be ranked to identify recommendations. In some embodiments, a composite score may be based on score(s) in view of generic bases such as well-known number sequences and on score(s) in view of category-relevant bases such as relation to category-relevant cognitive words, numbers, etc. A recommendation for a particular advertiser may take any suitable form, including identifying top-ranked number and/or providing a set of top-ranked numbers in a ranked order. Such a recommendation may be presented via the user interface.

As indicated by block 226, in some embodiments, graphical indicia based at least in part on the categorized telephone number inventory information may be presented. And, as indicated by block 228, one or more selections corresponding to the graphical indicia may be processed. In various embodiments, the graphical indicia could include one or more of text, symbols, images, icons, figures, dimension, color, and/or any other suitable means of graphical indicia that can be displayed on a display screen. As discussed herein, in various embodiments, information may be provided to a user by way of, without limitation, one or more widgets, text, text boxes, text fields, tables, grids, charts, maps, hyperlinks, buttons, lists, combo boxes, checkboxes, radio buttons, and/or the like.

As indicated by block 230, one or more phone numbers may be determined based at least in part on the one or more selections. In some embodiments, one or more user selections may indicate one or more specific telephone numbers. However, in some embodiments, one or more user selections may only indicate specific portions of one or more telephone numbers, such as the specific area code and prefix. In such cases where the user selection does not indicate a complete telephone number, the one or more telephone numbers corresponding to the partial telephone number selection may be determined on any suitable basis. In some embodiments, such bases may include one or more of a random basis, a characterization of the numbers as being more or less easy to remember, such as repetition of numbers, a natural and/or intuitive sequence of numbers, a relation to popular or well-known number sequences (e.g., historical dates), a relation to alphabetical characters (e.g., a relation such as a cognitive word(s), word portion(s), or acronyms), and/or the like.

As indicated by block 232, the one or more phone numbers may be assigned to an entity. Assignment information may be processed and retained in one or more data repositories. Such information may include any suitable telephony information to facilitate assignment, which may include without limitation information relating to virtual telephone numbers, target telephone numbers, account information, purchasing information, and/or the like. Inventory and tracking information records may be updated to reflect the assignments.

Figure 3:
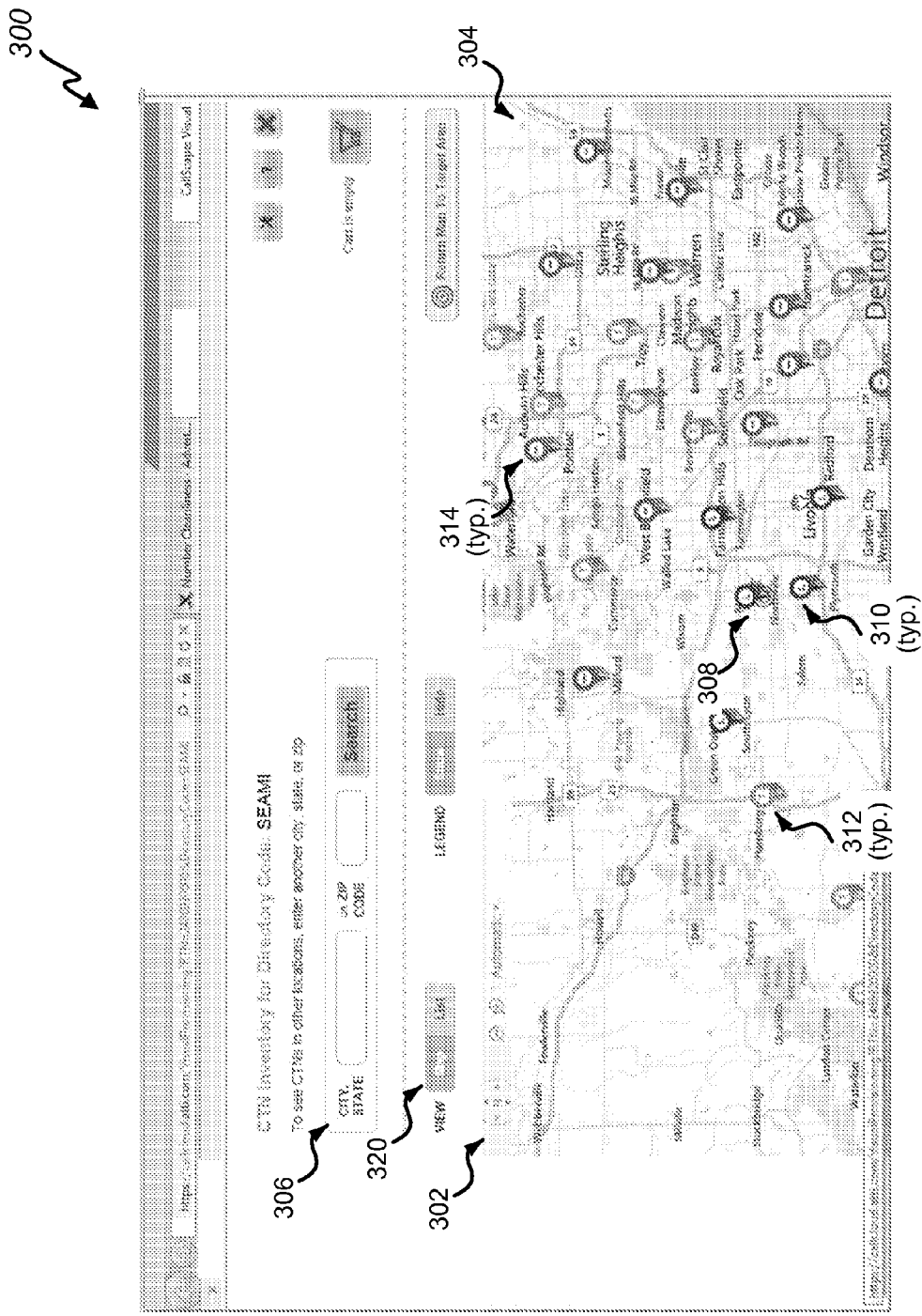
Figure 4:
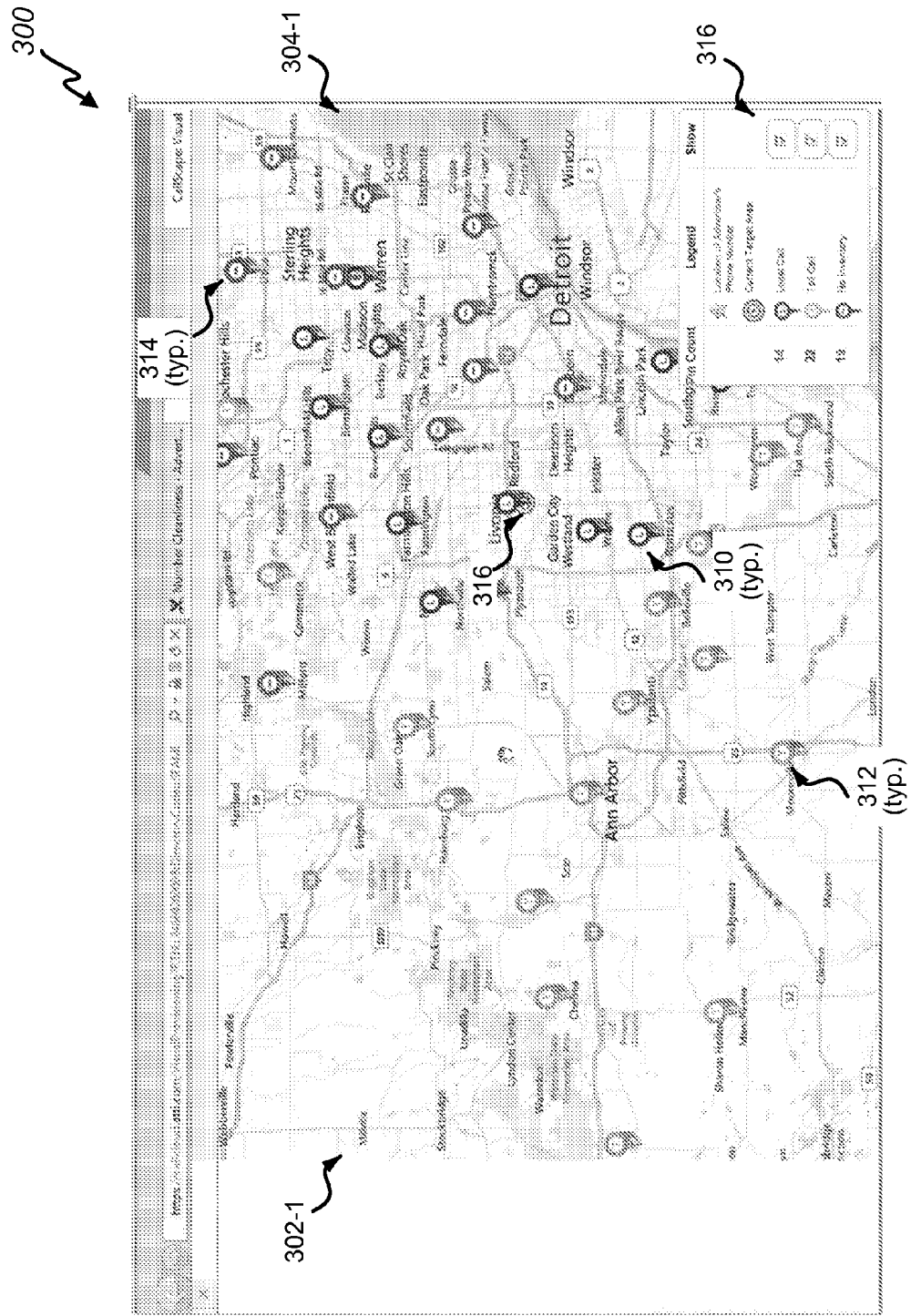

FIGS. 3 and 4 are screenshots illustrating example interface 300, in accordance with certain embodiments of the present disclosure. The interface 300 may provide for a visual and interactive way in which to research, discover, and choose phone numbers based at least partially on geography. The interface 300 may present a map interface component 302. The map interface component 302 may depict any desired geographical area 304, for example, a metro area or portion thereof. The geographical area 304 may correspond to one or more directories.

The interface 300 may provide one or more user-selectable options 306 for selecting a geographical area of interest, e.g., via input of a city, state, zip code, and/or the like. In the example depicted, a portion of the Detroit metro area is depicted. The target area could be with reference to a particular rate center and/or directory, in various embodiments. A particular target could be a rate center with which an advertiser's, consumer's, and/or other's ring-to number may be associated. The current target area may be graphically indicated in any suitable manner.

In the example depicted, the current target area may correspond to a particular directory for the Detroit area, and SEAMI may be a code for a directory in Detroit area, with a Northville rate center being a particular target rate center 308 within the footprint of the directory, the location of which is graphically indicated on the map interface component 302. The rate centers corresponding to the directory are shown. Accordingly, the example depicted allows for access to, and presentation of, customer telephone number inventory for the SEAMI directory. In some embodiments, only telephone numbers for the particular directory are shown, such that numbers out of that directory scope are not shown. In some embodiments, telephone numbers for multiple directories could be shown; and, in some embodiments, telephone numbers may be graphically distinguished from one another based on the particular directories with which the numbers are associated.

The interface 300 may allow for the indication of local calling areas. With reference to a selected target area, a local calling area may be determined. In some embodiments, a local calling area may be indicated with reference to one or more rate centers that allow for local calling in a target area. A local calling area may be identified with respect to one or more directories. For example, with reference to the current target area, one or more rate centers within a local calling area may be determined and indicated via the interface 300. Corresponding location(s) with one or more rate centers in the local calling area may be graphically indicated with a pin, color coding, alphanumeric indicia, and/or in any suitable manner. In the example depicted in FIG. 4, 14 rate centers 310 are identified as being in the local calling area with respect to the current target area.

In some embodiments, a local calling area may be additionally or alternatively graphically indicated with a perimeter, hash-marked area, shaded area, and/or in any suitable manner. The extents of such indications of perimeters and/or areas could be based on actual boundary information or could be estimated based on the one or more local call centers. For example, estimations could be based on a certain radius about a local call center and/or a certain distance between a local call center(s) and a toll call center(s) (e.g., a boundary could be estimated based on half the distance between an outermost local center of a local calling area and a toll call center near the local calling area).

In some embodiments not shown, a map interface could graphically indicate telephone numbers directly. Such indications could be placed on the map in relation to associate call areas. In some embodiments, presentation of telephone numbers could be staged so that, initially, only area codes and/or prefixes are displayed. Once the user chooses one or more prefixes, complete numbers having the prefixes could be presented for selection. In some embodiments, the process of revealing numbers could be iterative with, for example, single digits being displayed initially and additional digits being iteratively displayed responsive to corresponding iterative user selections of previous digits.

The extent of telephone number information displayed may vary in accordance with the map scope. For example, a relatively higher-level view could present less information, while a relatively lower-level view could present more information. In some embodiments, higher-level views would indicate rate centers as depicted but not telephone numbers directly, and lower-level views could depict at least portions of telephone numbers. The extent of information displayed could be proportionate to the amount of space so as to minimize visual clutter. In some cases, only top-ranked telephone numbers may be indicated partially or completely, and further telephone number information could be accessible upon user selection of one or more user-selectable options. For example, telephone numbers could be ranked on the basis of how many are available for a given prefix, call counts were given prefix, and/or on any other suitable basis.

In some embodiments, the interface 300 may allow for the indication of toll calling areas. Toll calling areas could be indicated with reference to the selected target area in similar manner as the local calling area as indicated. One or more rate centers 312 that would involve toll calls with respect to the target area may be determined. Such rate centers 312 could be indicated via the interface 300. Similar to the local call rate centers, toll call rate centers 312 may be graphically indicated with a pin, color coding, alphanumeric indicia, and/or in any suitable manner. In some embodiments, toll call rate centers 312 could be graphically distinguished from local call rate centers with color coding, alphanumeric indicia, and/or in any suitable manner. In the example depicted in FIG. 4, 22 rate centers 312 are identified as being outside the local calling area with respect to the current target area.

In some embodiments, the interface 300 may allow for the indication of availability of customer telephone numbers. The availability may be indicated in any suitable manner. In some embodiments, rate centers 314 for which there is no available inventory could be determined and indicated. Similar to the local call rate centers, rate centers 314 having no available inventory may be graphically indicated with a pin, color coding, alphanumeric indicia, and/or in any suitable manner. In some embodiments, such no-inventory rate centers 314 could be graphically distinguished from local call rate centers and/or toll call rate centers with color coding, alphanumeric indicia, and/or in any suitable manner. As one possible example out of many, local call centers 308 could be indicated with green pins and a letter L, toll call centers 310 could be indicated with yellow pins and a T, and no-inventory call centers 314 could be indicated with red pins and a negative sign. In the example depicted in FIG. 4, 19 rate centers 314 are identified as having no available inventory; thus, the local call centers 308 and toll call centers 310 that are displayed are implicitly indicated as having available inventory. If a different target area/call center is selected, the graphical indicia may change accordingly to reflect different call centers as being local call centers and toll call centers for the particular area.

In some embodiments, the interface 300 may include one or more user-selectable options to control what is shown via the map interface component 302. The depicted example includes a legend with user-selectable options 316 for controlling whether local call indicia, toll call indicia, and/or no inventory indicia are to be shown. Thus, for example, a user that is only interested in seeing available local call options may deselect toll-call indications and no-inventory indications so that neither is shown on the map interface component 302.

In some embodiments, the graphical indications 308, 310, 312, 314, 316 for rate centers could be user-selectable options. A particular rate center 308, 310, 312, 314, or 316 could be selected in order to adjust the current target area. In some embodiments, in addition or in the alternative, other means such as a text entry field, a menu, and/or the like could be employed to select a particular rate center 308, 310, 312, 314, or 316. In the example of FIG. 3, a rate center 308 corresponding to Northville is shown as selected; in the example of FIG. 4, a rate center 316 corresponding to Livonia is shown as selected.

In some embodiments, multiple rate centers within a given region of interest may be selected as targets. Local calling areas with respect to each particular target could be identified. The local calling areas could be graphically distinguished in any suitable manner, which may include color coding, perimeter outlining, shading, overlays, and/or the like.

Some embodiments may provide for the option of identifying a desired local calling area without identifying a particular target rate center. For example, a user could select a portion of the map interface to identify a point of interest, which could correspond to a central point of an area of interest. Then, the system could identify a set of top-ranked local numbers for the area of interest. One or more local calling areas with respect to the central point could be identified. In the case of the central point corresponding to multiple local calling areas having different scopes, local calling areas could be graphically distinguished in any suitable manner. As another example, a user could perimeter around a portion of the map interface to identify an area of interest. One or more local calling areas overlapping the specified portion could be identified. Other embodiments are possible.

Figure 5:
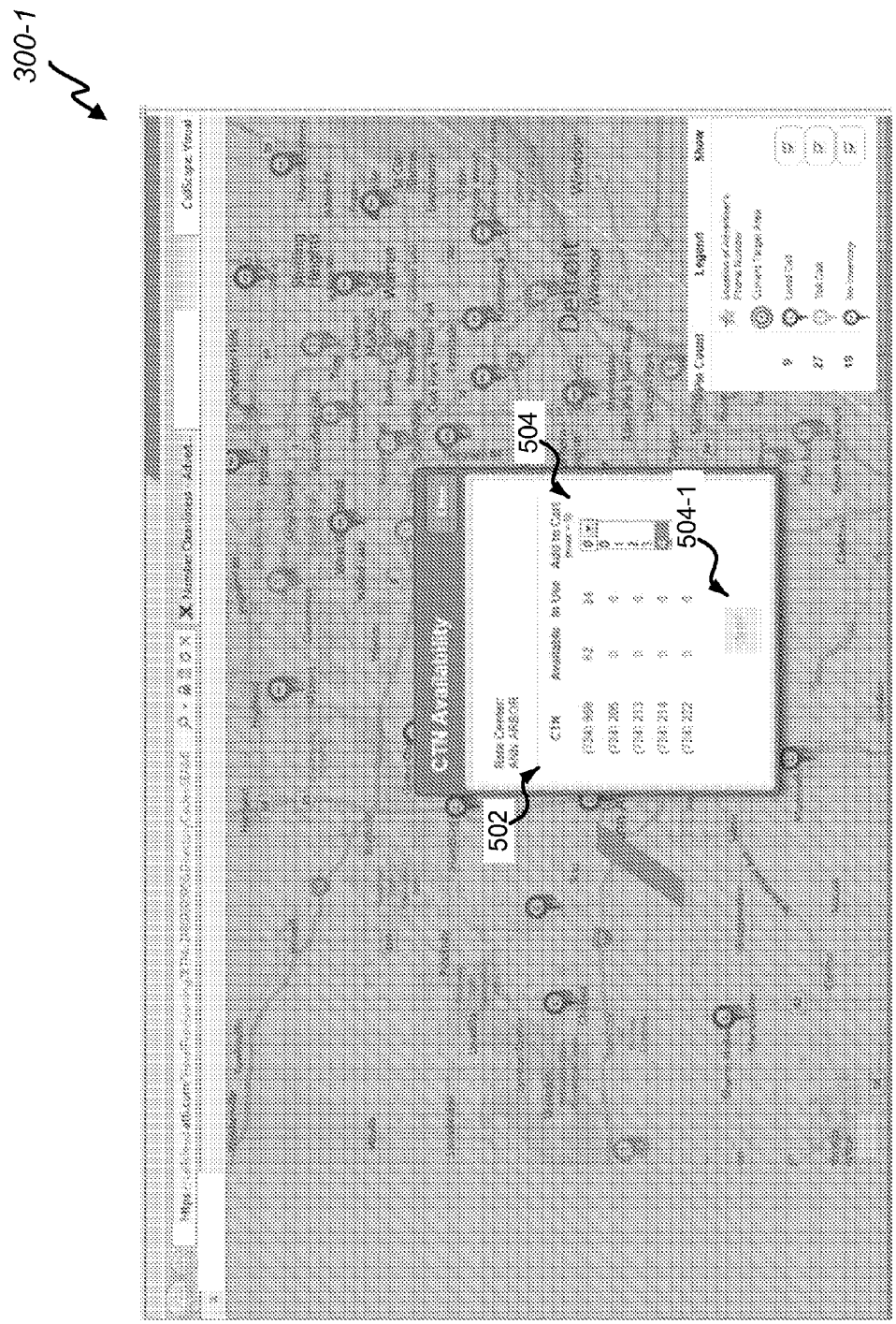

FIG. 5 is a screenshot illustrating example interface 300-1, in accordance with certain embodiments of the present disclosure. In the example interface 300-1, a rate center corresponding to Ann Arbor is shown as selected. In some embodiments, one or more user-selectable options may be provided to access customer telephone number options for a given rate center. Any number and type of customer telephone numbers associated with a given rate center could be presented any suitable manner. In some embodiments, only available telephone number information for a given rate center may be presented. Some embodiments may also indicate any suitable information about telephone numbers in use.

In the example depicted, a rate center corresponding to Ann Arbor has been selected, and telephone number information 502 for the rate center is presented. The telephone number information 502 may include telephone number options, which may be indicated by area code and prefix, as in the example depicted, or in any other suitable manner. In some embodiments, options for selecting complete telephone numbers may be provided. For example, an option to drill down into the details of specific numbers are available for a particular area code and prefix may be provided via an expandable tree and/or any other suitable means of displaying detailed information on available numbers. As shown, indications of number availability and/or numbers in use may be presented.

In some embodiments, one or more user-selectable options 504 for selecting available numbers may be presented. As in the example depicted, a user may have the option 504 of selecting a particular quantity of available numbers, e.g., for addition 504-1 to a shopping cart. Alternatively or additionally, a user may have the option of selecting complete numbers one at a time.

Figure 6:
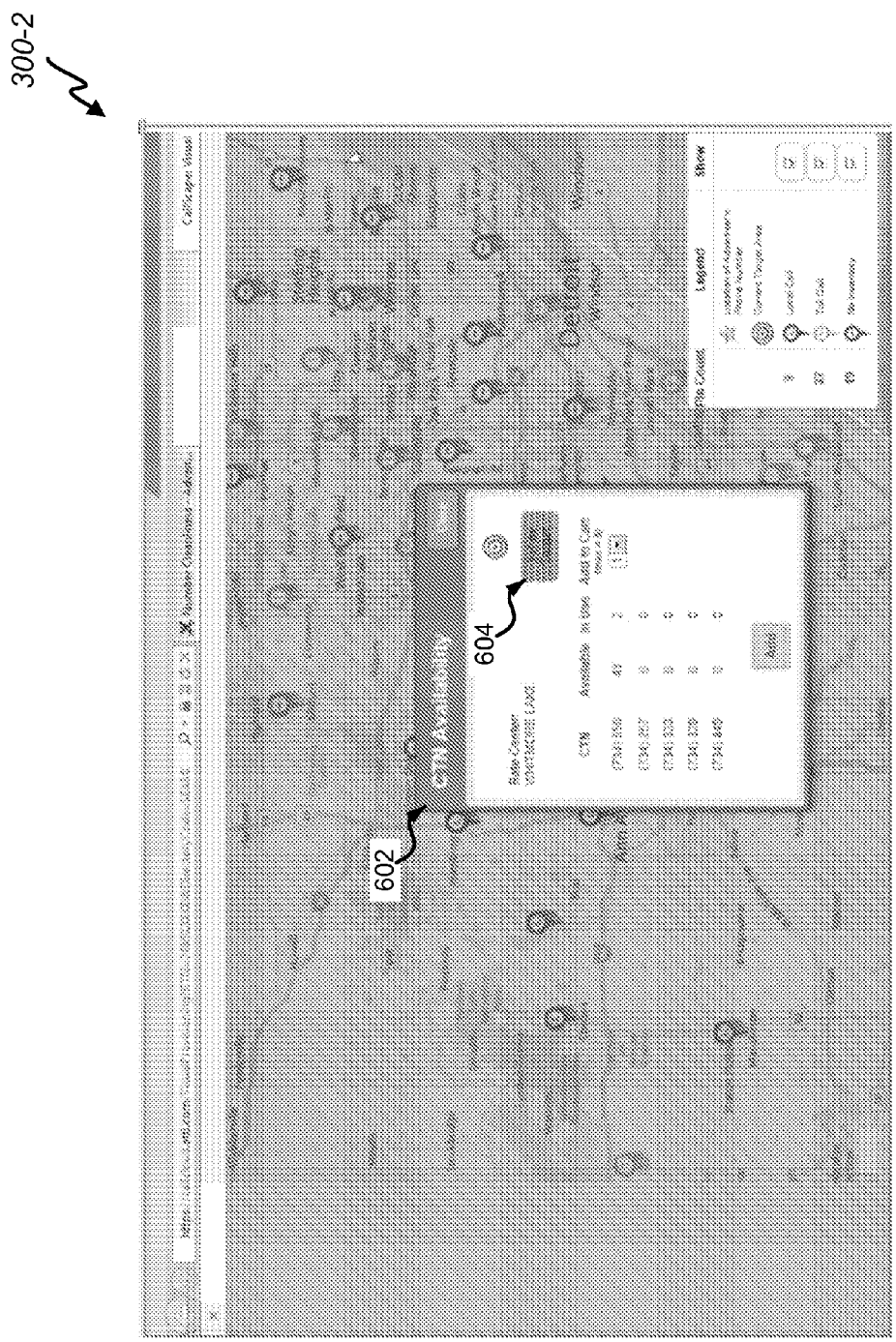

Options for selecting multiple rate centers could be provided. FIG. 6 is a screenshot illustrating example interface 300-2, in accordance with certain embodiments of the present disclosure. As shown in FIG. 6, an option to select another rate center could be provided. The example depicts telephony availability information 602 for a rate center corresponding to Whitmore Lake having been selected from the local calling area where the Ann Arbor rate center is set as the target. Number selection for the additional rate center could proceed with options as previously disclosed. Additionally, an option 604 for setting the additional rate center as the new target may be provided. Selection of that option 604 may or may not result in a change of the local calling area and which rate centers are local call rate centers.

Figure 7:
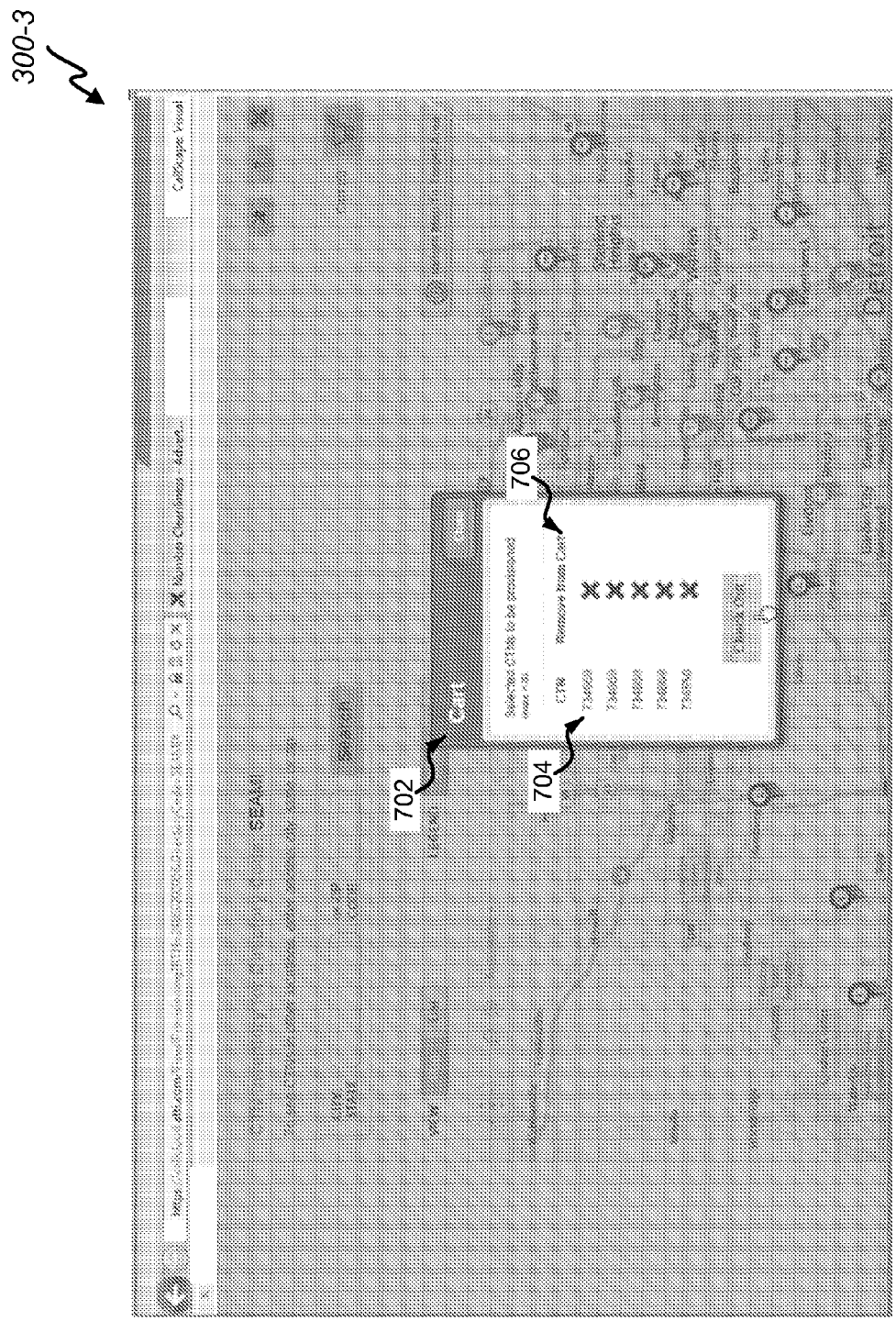

FIG. 7 is a screenshot illustrating example interface 300-3, in accordance with certain embodiments of the present disclosure. As shown in FIG. 7, an interface 300-3 may be provided for the user to view the cart 702, including which numbers 704 have been selected for provisioning. In some embodiments, only the area code and prefix categories for the selected numbers 704 may be shown in the cart 702; in some embodiments, the complete numbers selected 704 may be shown in the cart 702.

A user could have the option 706 to modify the cart 702, such as by removing particular numbers 704 or number categories (not shown) from the cart 702, before checking out. Consequent to confirming the contents of the cart 702, a user may check out and be provisioned the finally selected numbers for use in some embodiments, a user may be an internal user, e.g., a user that is internal to a company such that no purchase is required; in other embodiments, a purchase workflow may be provided for those users that need to purchase the numbers for use. Some alternative embodiments may provide options to see and select a particular number for direct provisioning, with a single click, for example, such that no shopping cart is necessary.

Consequent to final selection, assignment information may be processed and retained in one or more data repositories. Such information may include any suitable telephony information to facilitate assignment, which may include without limitation information relating to virtual telephone numbers, target telephone numbers, account information, purchasing information, and/or the like. Inventory and tracking information records may be updated to reflect the assignments.

Figure 8:
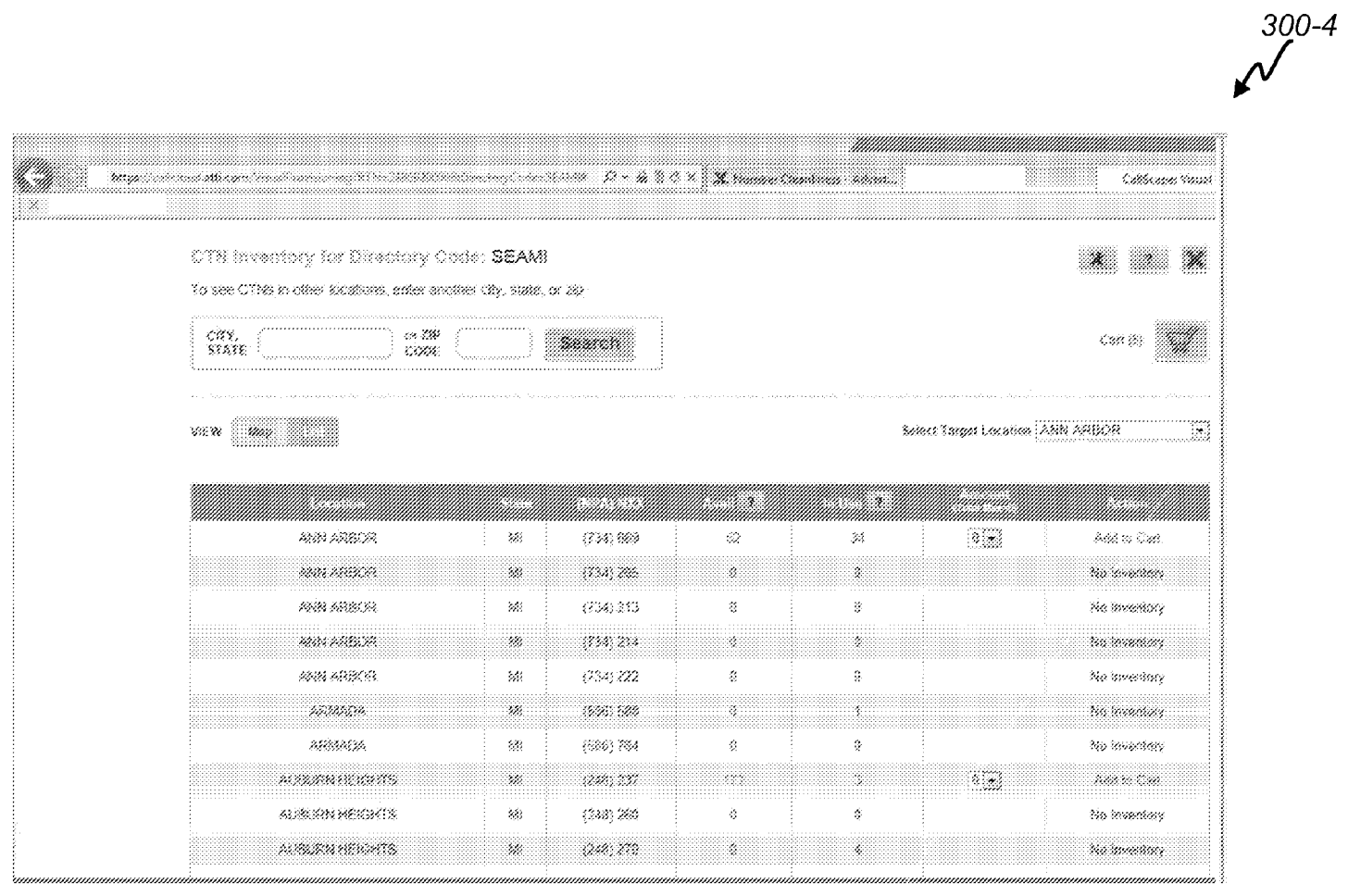

Referring again to FIG. 3, user-selectable options 320 for viewing information in a map view and/or a list view could be provided. FIG. 8 shows a screenshot of one example list view 300-4, in accordance with certain embodiments of the present disclosure. The list view 300-4 may show the same or similar information as the map view and may allow for number selection like the map view.

Figure 9:
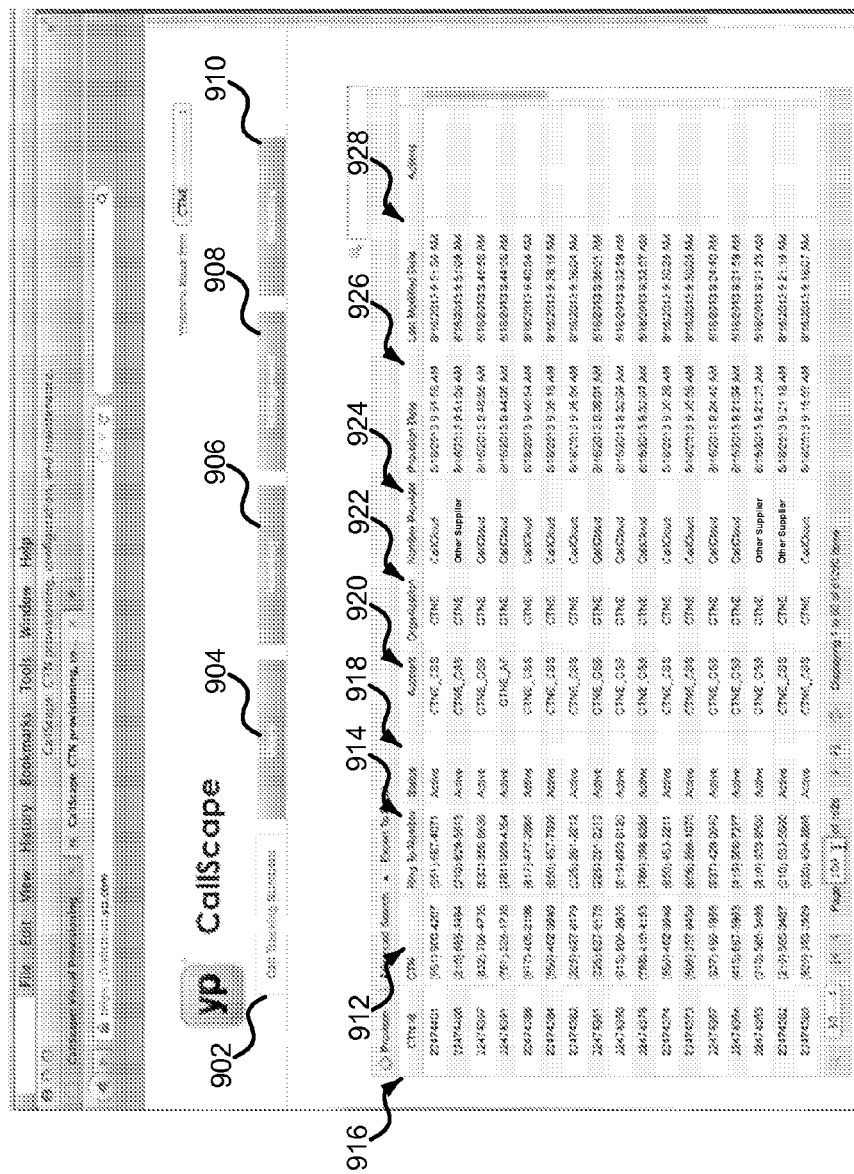
FIGS. 9 through 12 depict screenshots illustrating example callscape interfaces for accessing telephony details for telephone number provisioning and/or telephony information management, in accordance with certain embodiments of the present disclosure.

FIG. 9 is a screenshot illustrating example interface 900, in accordance with certain embodiments of the present disclosure. The interface 900 may provide for a visual and interactive callscape. In some embodiments, the interface 900 could be tied to the interface 300 and order to provide a segue to more detailed call information. The interface 900 may provide user-selectable options for accessing information regarding one or more of a call tracking 902, users 904, inventory 906, management 908, and/or statistics 910.

Call tracking numbers 912 could be mapped to ring-to numbers 914 for particular customers. A call tracking number ID 916 could likewise be associated with one or more particular call tracking numbers 912 and one or more particular ring-to numbers 914. Status information 918 could be mapped to the particular numbers in order to indicate a current status such as active, inactive, obsolete, reassigned, and/or the like. Such call tracking information may be mapped to various customer accounts 920, organizations 922, users, and/or the like. In some embodiments, numbers may be provided by the telephony management system, e.g., the callcloud. In some embodiments, alternatively or additionally, numbers may be provided by another supplier, such as a third-party vendor. Accordingly, provider information 924 may be tracked and presented via the callscape interface 900. Provisioning information 926 and modification information 928 may likewise be mapped to various numbers.

Certain embodiments may provide for organizing and providing access to call tracking information according to particular regions of interest. In various embodiments, a callscape view may be invoked for particular telephone numbers, particular call centers, local call centers, toll call centers, no-inventory call centers, particular local calling areas, particular toll call areas, particular metro areas, and/or the like, any one or combination of which may be presented via the interface 300 along with user-selectable options to segue to a desired callscape.

In some embodiments, the interface 900 may be provided to a representative, such as a sales/customer service representative associated with the number provider. In some embodiments, options for exposing callscape information to end users, such as advertisers, may be provided. For example, a representative working with a particular advertiser may wish to display information presented with the interface 900 and/or the interface 300. In various embodiments, such options may include on-demand videoconferencing, web conferencing, image piping, and/or the like. For example, callscape information may be provided to the advertiser platform. Such exposure of information may be controlled by the representative and could involve read-only access being provided to the advertiser. The interface 900 could allow for drilling down into details regarding call information in any suitable manner and to any suitable extent.

Figure 10:
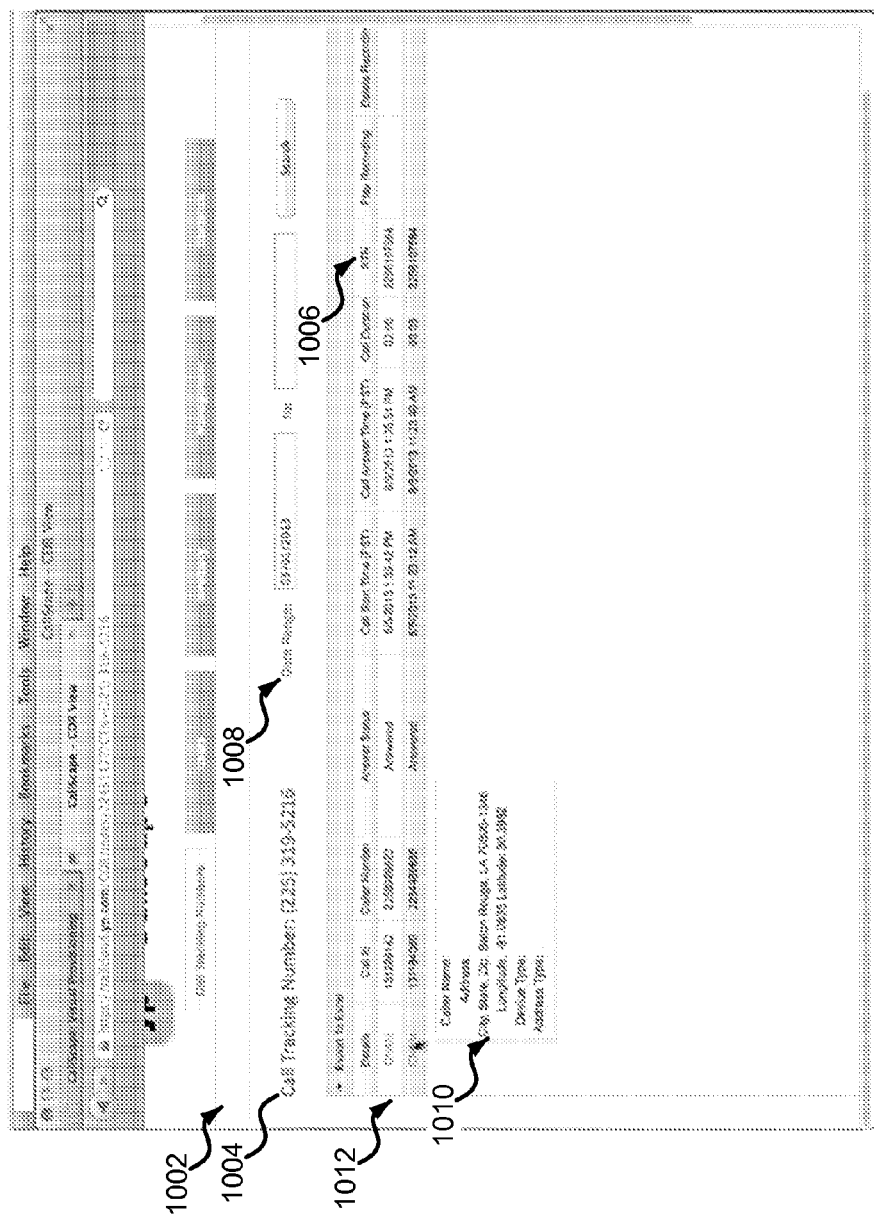

FIG. 10 is a screenshot illustrating example interface 900-1, in accordance with certain embodiments of the present disclosure. As depicted in FIG. 10, additional details 1002 regarding particular call tracking numbers may be accessible. A particular call tracking number 1004 may be mapped to a particular ring-to number 1006, and information 1002 for the call tracking number 1004 may be consolidated, sorted, and presented for particular date range 1008. For example, CNAM information 1010 may be provided, which may include caller name information, address information, location information, device information, ID information, telephone number information, and/or the like. Additionally, information 1012 regarding particular calls may be provided, which may include answer status (i.e., whether or not the call was answered), call start time, call answer time, call duration, call recording, and/or the like. Additional information regarding various embodiments of call tracking, location identification, communication references, and other data capture features, are disclosed in U.S. patent application Ser. No. 13/965,123, filed Aug. 12, 2013

(entitled Sales Lead Qualification of a Consumer Based on Sales Lead Rules, by Jain et al.), which is hereby incorporated by reference for all purposes.

While such information is depicted as being provided on a call tracking number basis, in certain embodiments, similar information could be provided on a particular user basis. For example, certain users such as advertisers may be associated with multiple call tracking numbers.

Various user-selectable options may be provided to access any suitable details regarding particular call tracking numbers. For example, features may be provided so that additional details are revealed when a selection tool is used to hover over and/or click on a customer telephone number and/or related information. In certain embodiments, such features for accessing additional details may be provided in a map view.

Figure 11:
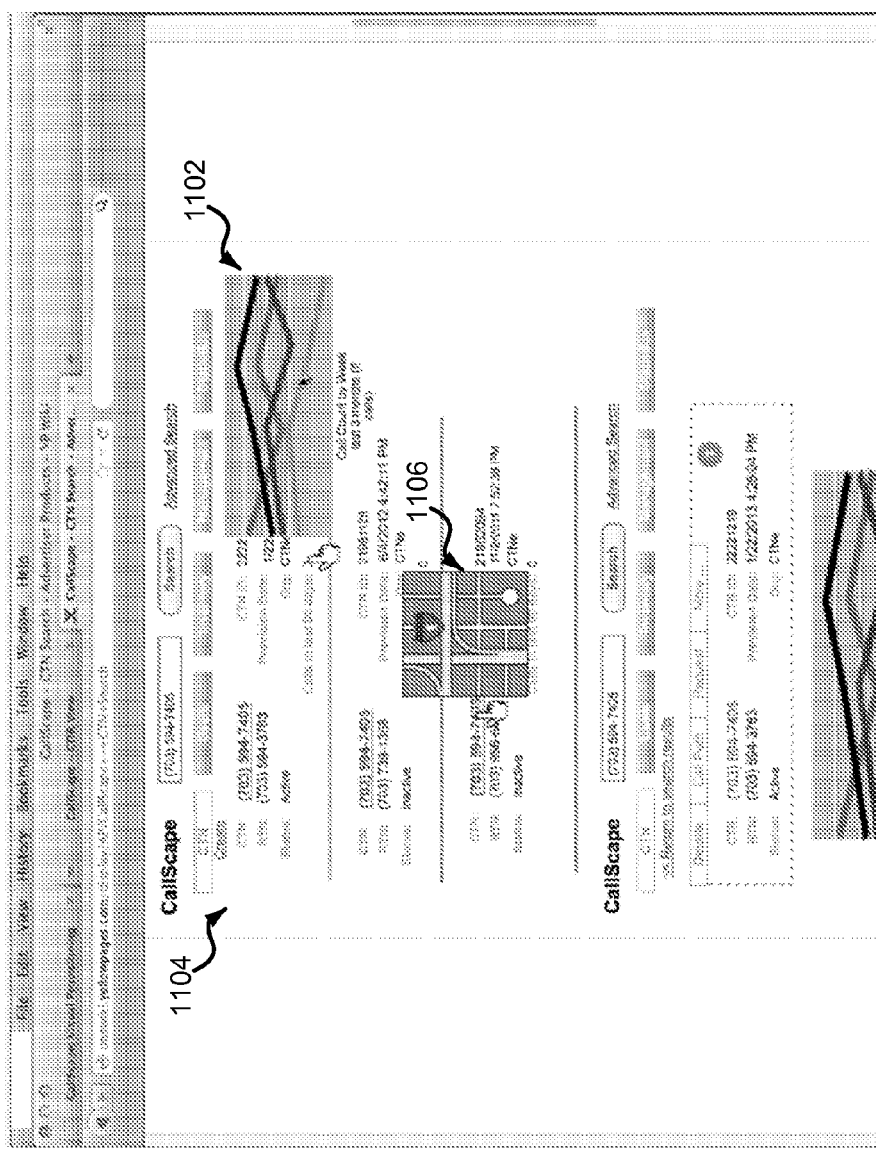
Figure 12:
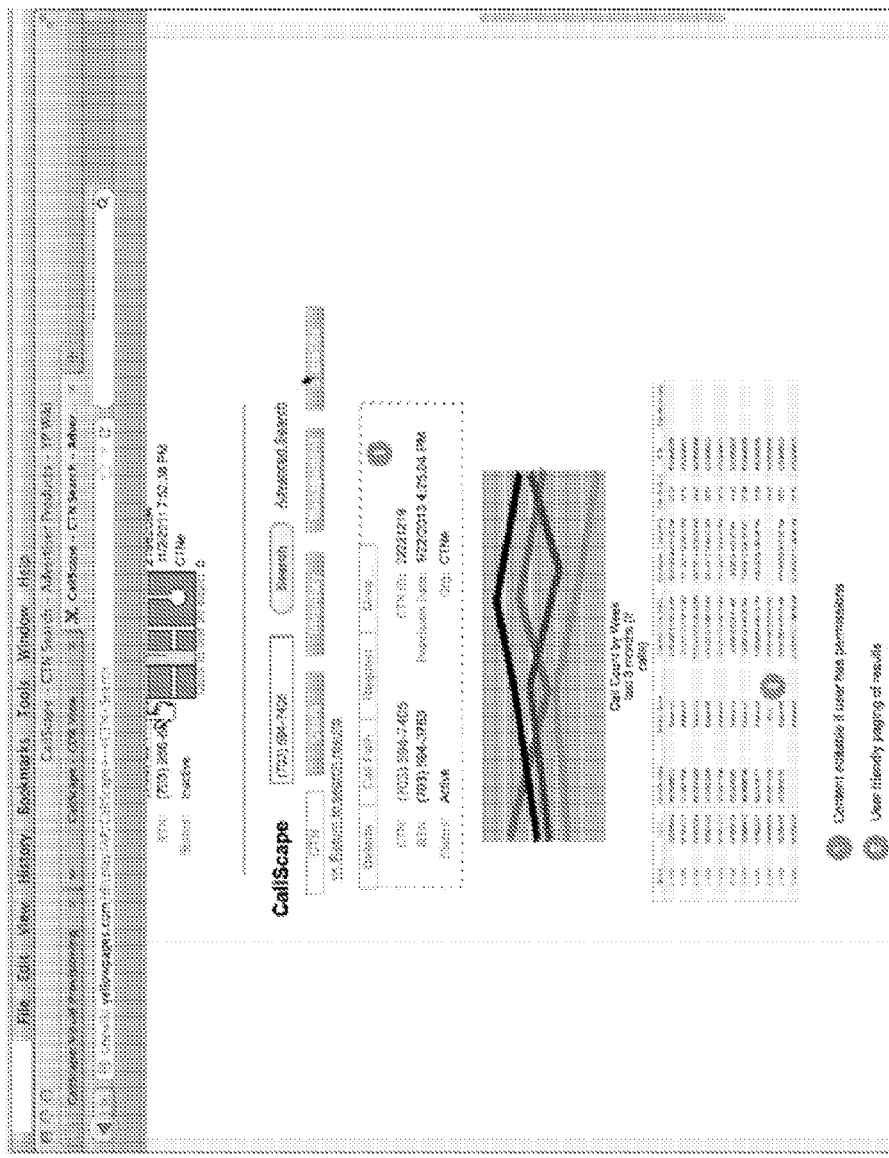

Certain embodiments provide one or more options to select one or more telephone numbers in use in order to access information about the one or more telephone numbers. One or more search options also could be provided to search for details on specific numbers, which may include numbers that may be already assigned, that may or may not be available (e.g., vanity number searches), and/or the like. FIGS. 11 and 12 are screenshots depicting an example callscape interface 1100 for accessing details on specific numbers, in accordance with certain embodiments of the present disclosure. With the callscape interface 1100, information similar to that described above may be provided with respect to particular numbers. Additionally, call count information 1102 over a certain period may be provided. In some embodiments, a call tracking number history 1104 may be provided. The call tracking number history 1104 may capture information regarding the assignment of particular call tracking number to various ring-to numbers in the present and in the past. Information similar to that described above may be provided with respect to each call tracking number assignment. In some embodiments, call count information and/or other statistics may be provided for each assignment, allowing for comparison of such information. Location information 1106 for particular customers may also be depicted graphically in some embodiments.

A time period selection feature may be configured to allow for selection of a time period for which to view certain call metrics. Past call metrics, current call metrics, and projected call metrics options may be provided. Past call metrics could show metrics for past week, month, billing period, three months, six months, year, etc. Current call metrics could show real-time metrics in the context of recent activity such as the last hour, day, week, etc. Projected call metrics could show extrapolation of past and/or current data into future, such as any coming time period. Projected call metrics could be based on any suitable factor, including aggregate performance of other advertisers in the market, market data for a particular location, and/or the like.

A graphic selection feature may be configured to present access to details of metrics and/or any suitable data according various embodiments herein in any suitable format with any suitable graphics. By way of example without limitation, pie charts, bar graphs, line graphs, tables, with features allowing ordering and/or filtering of data according to any suitable criteria, matrices, Venn diagrams, images, photos, and/or the like may be implemented according to various embodiments. In some embodiments, the graphic selection feature may allow for user customization and/or manipulations of graphics presented with a dashboard.

In embodiments, a user-selectable create option may be provided. Such an option may allow a user to assign particular CTN to a ring-to number and create a new record for provisioning the number to a new user. In some embodiments, a user-selectable call path option may be presented to provide access to call path information. In various embodiments, one or more additional user-selectable options may be provided.

Any suitable information about the one or more telephone numbers may be provided in various embodiments. For example, a user-selectable option may be provided in order to see call counts/volume that a particular telephone number and/or set of telephone numbers has received over a certain time period. Such a tool providing access to number usage data could facilitate a sales situation, for example. Information about various numbers in use were given region could be used to identify traffic, activity, and demand for the region. Say, for example, a sales representative or an advertiser can identify that a set of telephone numbers in use for a given region are each getting a minimum of 50 calls per month; that information could be considered in making advertising decisions (e.g., which regions to target). Various embodiments could provide such telephone information by telephone number and/or by a portion thereof (e.g., by NPA NXX), by rate center, and/or by region. With interface 900 and/or 1100, call information, caller data, characteristics corresponding to calls, characterization of callers (such as qualifications, attributes, etc. determined by the management system, caller-specific information (such as demographic information about the contact's age, income, marital status, parental status, social/business networks, home ownership, etc.), consumer-specific data (such as particular purchases or buying habits of the caller), area information pertinent to the location of callers and/or businesses (e.g., information about average age of residents in the area, average income, percentage with children, percentage married, education levels, home ownership, etc.), and/or the like may be provided.

Certain embodiments provide one or more options for ordering more inventory. For example, a no-inventory call center may be augmented with additional inventory that is generated by the information handling system and/or acquired one or more data sources, which may correspond to third-party vendors, for example. Such a mode could also be used to augment other call centers, not just no-inventory call centers. This may facilitate inventory management, where desirable, such as in the case of a remote sales office desired order more telephone numbers directly. In some embodiments, the procurement of additional inventory may be on a call-center basis and/or on a metro-area basis. Orders for additional inventory may be placed via one or more user-selectable options via a user interface, such as any user interface of various embodiments disclosed herein (e.g., via a map interface such as interface 300). With additional inventory being procured, the additional inventory may be reflected by the visual interface.

One or more call statistics features may be configured to present access to details regarding any suitable call data. Options for presenting access to details about calls using a particular number may be presented. Such options may include calls per particular location, calls per particular caller of interest, successful calls that were successfully connected, missed calls, dropped calls/calls receiving a busy tone, voicemails left by callers, call-back statistics, call lengths, whether calls were recorded, and/or the like. For instance, a call of interest feature could identify a number of calls from a particular caller in a particular time period as an indication of interest. A caller who has made five calls to a particular advertiser or to advertisers in a particular service category in the last ten minutes may be taken as an indication of high interest.

In some embodiments, a peer group feature may be configured to present access to details regarding peer group of advertisers. A peer group of advertisers could be identified and/or defined by advertising category and/or geography. A peer group statistics feature may be configured to present access to details any suitable call data regarding a peer group. The data could be anonymized in some embodiment to only show aggregated information; in other embodiments the data may not be anonymized, but may tie particular data to particular advertisers in the peer group. For example, the data could be specifically tie to particular advertisers of a sales force within a company. Any type of call data may be compared.

It is to be understood that the depicted interfaces disclosed herein are for example purposes only. Accordingly, any suitable GUI/dashboard may that may include or present data for users according to various embodiments may be presented in any suitable format with any suitable layout of any suitable sets/subsets of features, along with any desired graphical depiction of information, to facilitate features of various embodiments of the present disclosure. In various embodiments, one or more user-selectable options may include one or more of a screen-labeled function key, an icon, a button, a soft button, a window, a menu, a control widget, a scroll bar, a slider, a listbox, and/or the like. In various embodiments, one or more user-selectable options may be selectable via one or more of touch, push, movement-based selection, and/or any suitable navigation feature.

Figure 13:
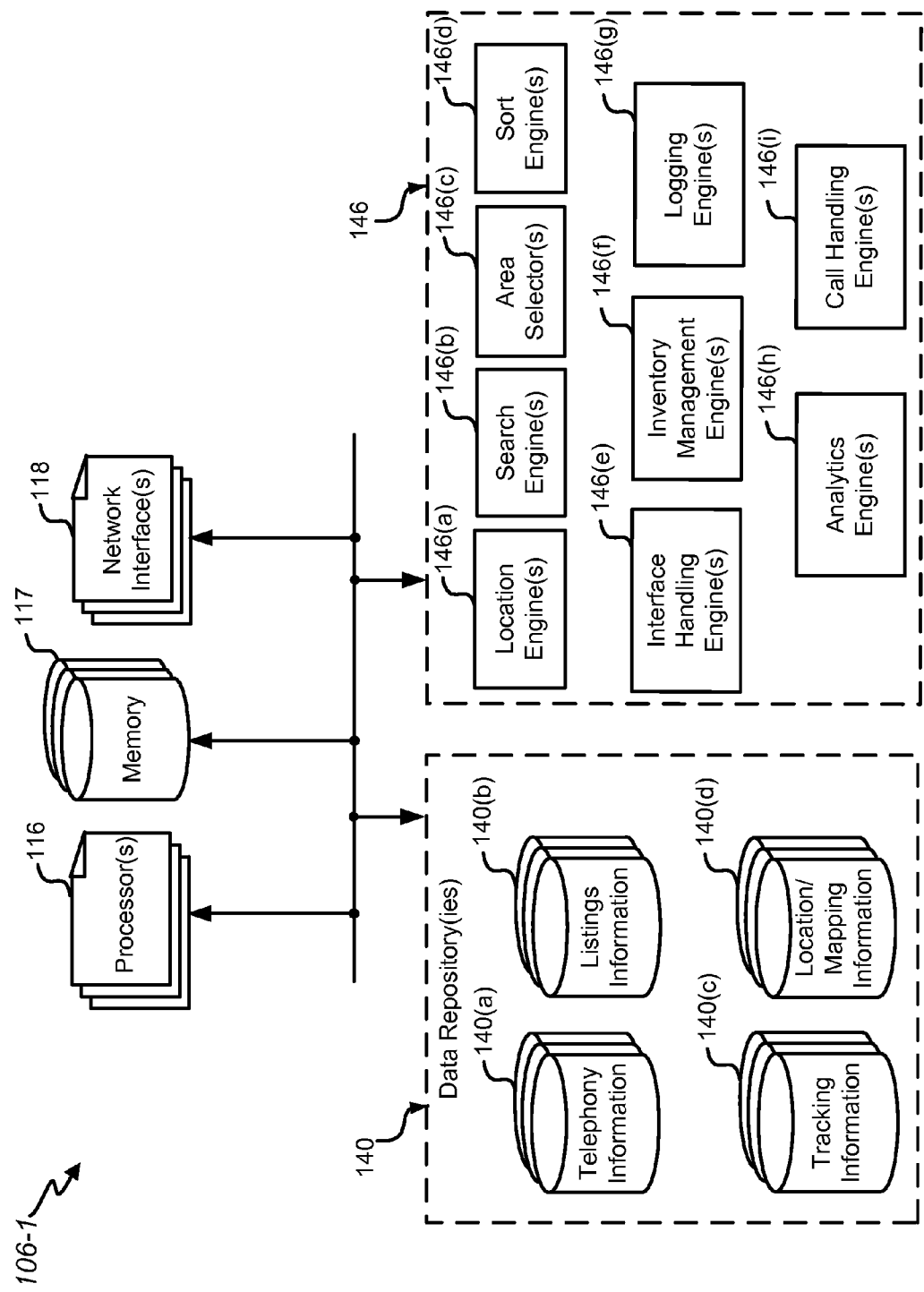
FIG. 13 depicts a high-level block diagram of a telephony management system, in accordance with certain embodiments of the present disclosure.

FIG. 13 shows a high-level block diagram of a telephony management system 106-1, in accordance with certain embodiments of the present disclosure. The system 106-1 may correspond to the system 106 of FIG. 1, but one embodiment of the system 106 is shown in more detail. While engines, repositories, and other components are described separately herein, it should be appreciated that the components may be combined and/or implemented differently in any combination to provide certain features in various embodiments. In various embodiments, different processes running on one or more shared computers may implement some of the components.

The telephony management system 106-1 may be, correspond to, and/or include one or more servers and/or switches that, in various embodiments, may include one or more switches and/or media gateways, such as telephone, messaging, email, application, and/or other types of gateways. One or more network interfaces 118 may be communicatively coupled to processors 116. In various embodiments, one or more of the processor(s) 116, memory 117, and/or network interface(s) 118 may correspond to the one or more servers. The network interface(s) 118 may include any suitable input/output module or other system/device operable to serve as an interface between one or more components of the telephony management system 106 and the one or more networks 104. The telephony management system 106-1 may use the network interfaces 118 to communicate over the networks 104 using any suitable transmission protocol and/or standard.

In some embodiments, a server may communicate with a mobile computing device 102 via HyperText Transfer Protocol (HTTP) and/or other types of communication protocols, such as File Transfer Protocol (FTP), Wireless Application Protocol (WAP), etc. In some embodiments, a server may provide static web pages, dynamic web pages, and/or web services. In some embodiments, a server may provide web applications to a mobile computing device 102 for execution in a web browser running on the mobile computing device 102; and the web applications may include scripts for execution within an isolated browser environment. In some embodiments, a server may provide rich-client applications to a mobile computing device 102; and the rich-client application may be programmed to have access to functions of the operating system running on a mobile computing device 102.

In some embodiments, the telephony management system 106-1 receives, places, and/or routes telephone calls over packet switched networks. In some embodiments, the telephony management system 106-1 may provide packet-switched connections between callers and advertiser representatives, which correspond to the destinations of click-to-call requests. In some embodiments, the telephony management system 106-1 can place and/or receive direct VoIP calls to/from the callers/advertiser representatives. In some embodiments, the telephony management system 106-1 may use a data network completely (along with one or more access points via 3G/4G/Wi-Fi, e.g.), as opposed to through a PSTN.

The telephony management system 106-1 may include one or more data repositories 140. In various embodiments, the data repository(ies) 140 may be implemented in various ways. The data repositories 140 may include database(s), database management system(s), server(s) to facilitate management/provision/transfer of information, and/or the like. For example without limitation, one or more data processing systems may store information. One or more relational or object-oriented databases, or flat files on one or more computers or networked storage devices, may store information. In some embodiments, a centralized system stores information; alternatively, a distributed/cloud system, network-based system, such as being implemented with a peer-to-peer network, or Internet, may store information. Various information related to given subscriber/user may be linked in any suitable manner.

In some embodiments, the telephony management system 106-1 may include one or more data repositories 140 may include one or more telephony information repositories 140(a) that may retain any suitable telephony information to facilitate embodiments disclosed herein, which telephony information may include without limitation information relating to virtual telephone numbers, target telephone numbers, which may include "ring-to" telephone numbers, virtual-target telephone number mapping information, metadata, rate center information, local call information, toll call information, availability information, telephone number inventory information, any phone number information pertinent to domestic mobile network phone numbers and/or foreign mobile network phone numbers, and/or the like. In some embodiments, the target telephone numbers phones may belong to advertisers, which may correspond to one or more of institutions, businesses, individuals, etc. that could be seeking publicity through various media channels, such as web servers, WAP servers, short messaging services, etc., and which may or may not use the network(s) 104.

In various embodiments, assigned telephone numbers (virtual telephone numbers, a target/ring-to telephone numbers, and/or the like) may be delivered with content information (e.g., advertising content, web page, WAP page, short message, television programs, news articles, etc.) to various end-users, publishers, media channels, and/or the like. In embodiments where an end-user device is a mobile device, content information, including advertisements, may be transferred to the device through wireless communication connections, such as cellular communication links, wireless access points for wireless local area network, etc. In some embodiments, an end-user device can receive content information from multiple types of media channels (e.g., a web server, a WAP server, a SMSC, etc.). In some embodiments, an end-user computing device 102-1 may be able to initiate a phone call (e.g., automatically dialing according to the encoded phone number embedded in the content information to facilitate a click-to-call feature).

In some embodiments, the one or more data repositories 140 may include one or more listing information repositories 140(b) that may retain any suitable telephony information to facilitate embodiments disclosed herein, which listing information may include without limitation information relating to business entities, any local listings information suitable for embodiments of this disclosure, such as business, product, and service information, and/or the like. In certain embodiments, the local listings information may correspond to directory information of the kind available via Yellow Pages services and the like. The listings 140(a) may include addresses, telephone numbers, advertisements, announcements, and/or end-user information, etc.

In some embodiments, the one or more data repositories 140 may include one or more tracking information repositories 140(c). The one or more tracking information repositories 140(c) may retain any information suitable to facilitate tracking, linking, and/or routing of calls and messages according to various embodiments. The one or more tracking information repositories 140(c) may retain any call data, call data records, authentication information, including, for example without limitation, the authentication information may unique user identification information, unique device identification information, IMSI information, password information, and/or the like. Other types of retained information could include information relating to devices that subscriber uses and has used to interface with the system. For example without limitation, information about the specific devices, device configurations, and/or device capabilities that a gives subscriber uses could be tracked and retained in a repository.

In some embodiments, the one or more data repositories 140 may include one or more location/mapping information repositories 140(d). The one or more location/mapping information repositories 140(d) may retain any information suitable to facilitate mapping and location-based features of various embodiments disclosed herein. For example, mapping information/images, street addresses or other location parameters, such as longitude and latitude coordinates, stored as locations. The telephony information 140(a) and/or listings 140(b) may be associated with locations 140(d). The locations 140(d) may be part of the telephony information 140(a) and/or listings 140(b), or associated therewith.

The telephony management system 106-1 may include one or more of engines 146 and/or modules that may be stored in the one or more memories and may include one or more software applications, executable with the processors, for receiving and processing requests, process information, presenting information, call routing and handling, and/or the like. The one or more of engines 146 and/or other modules may be configured to perform any of the steps of methods described in the present disclosure.

The one or more of engines 146 may include one or more of location engine(s) 146(a), a search engine(s) 146(b), an area selector(s) 146(c), and/or a sort engine(s) 146(d) to process information according to various embodiments, which processing may be based at least in part on the information stored in one or more data repositories 140. The one or more of engines 146 may include interface handling engine(s) 146(e) that may include logic to send, present, and receive information, with one or more of the interfaces to/from one or more users and/or network components. The interface handling engine(s) 146(e), with one or more the processors 116, may utilize one or more network interfaces 118 to transceive information through the networks 104. The system 106 may pull and/or push information from those entities in any suitable way. For example without limitation, the system 106 may pull and/or push information from a computing device 102, 112 to facilitate features of embodiments discussed herein. The one or more of engines 146 may include inventory management engine(s) 146(f) that may include logic for implementing inventory features in various embodiments. The inventory management engine(s) 146(f) may be configured for acquiring, processing, formatting, checking, maintaining, modifying, and/or storing telephone number inventory information in the one or more repositories 140.

The one or more of engines 146 may include logging engine(s) 146(g) that may include logic for implementing information logging features in various embodiments. By way of example without limitation, the logging engine(s) 146(g) could process data pulled and/or pushed from various entities. The logging engines 146(g) may be configured to perform logging processes to receive and log data of interest for calls. In some embodiments, logging engines 146(g) may include logic to retrieve, process, derive, compile, aggregate, handle, store, report, and/or present information relating to call data associated with various telephone numbers. In some embodiments, the logging engines 146(g) may include tracking logic to track calls and/or call data, in accordance with certain embodiments. By way of example without limitation, the logging engines 146(g) may be configured to identify whether a caller is successfully connected with an advertiser, whether the call is missed, whether the call is dropped/disconnected/receives a busy tone, whether the call is routed to voicemail, whether a voicemail is left, and/or the like. In some embodiments, the logging engines 146(g) may include ANI logic to identify numbers of callers. In some embodiments, the logging engines 146(g) may be configured to track the length of calls. In some embodiments, the logging engines 146(g) may be configured to record calls. Data of interest could include other types of data such as more details around call/click data, caller name information from calling name delivery (CNAM), also known as caller identification or caller ID; location information, such as information about the area of a caller, demographic data about the area, history for a particular area; history for particular callers, and/or the like.

In some embodiments, the one or more of engines 146 may include analytics engine(s) 146(h) that may include logic for implementing information analytics features in various embodiments, such as call analytics. For example, current call data may be compared to past call data. In some embodiments, a particular advertiser or other user may compare that particular advertiser's call data to call data of other numbers, which could correspond to a peer group of advertisers. A peer group of advertisers could be identified and/or defined by advertising category and/or geography. Any type of call data may be compared. An advertiser may have user-selectable options to select different types of statistics for comparison and order by different types of statistics. Statistics could be based on time, that is, what has happened in the last hour, day, week, etc. Statistics could be filtered based on distance. For example, statistics could indicate that one or more calls and/or click originated from a distance of X miles with respect to a reference point.

The one or more of engines 146 may include call handling engine(s) 146(i) that may include logic to implement and/or otherwise facilitate any call handling features discussed herein. By way of example without limitation, the call handling engine(s) 146(i) may be configured to one or more of decode, route, and/or redirect calls to/from users. Dialing an assigned phone number may connect the phone call to a call handling engine 146(i). The call handling engine 146(i) may include one or more call routing modules. The call routing module may include one or both of a router and a decoder. In some embodiments, based at least partially on the communication reference selected, such as a phone number dialed and/or a call button selected, the call routing module may determine one or more corresponding target communication references using the telephony information repository 140(a) and may connect the phone call to one or more users through the network 104.

In some embodiments, the network 104 may include a telephone network. The telephone network 104 may be circuit switched, package switched, or partially circuit switched and partially package switched. For example, the telephone network may partially use the Internet to carry the phone call (e.g., through VoIP). For example, a connection between a user computing device 102, 112 and the call routing module may be carried using VoIP; and the connection between a router and a decoder of the call routing engine may be carried using a land-line based, circuit-switched telephone network.

In some embodiments, to make a voice connection responsive to a click-to-call selection by the user of a computing device, one or more IP messages may be sent via one or more access points to one or more servers/switches of the telephony management system 106-1. The one or more IP messages may indicate the communication reference information, the identification information, and/or another identifier (which could be an authentication token/key, in some embodiments) from which phone number information of the computing device may be identified and/or determined. The one or more IP messages could indicate the phone number information for an advertiser representative corresponding to the advertisement selected. Alternatively, an identifier of the advertiser representative and/or advertisement could be indicated, and the telephony management system 106-1 could determine the phone number information for the corresponding advertiser representative, e.g., based on information stored for the advertiser.

In some embodiments, one or more SIP requests may be sent via one or more access points to one or more servers/switches of the telephony management system 106-1. In some embodiments, the telephony management system 106-1 can place separate VoIP calls over the IP network(s) to an advertiser representative and a caller, and then bridge the calls. Accordingly, each of the advertiser representative and the caller receives an inbound call placed via the packet switched network 104, and the telephony management system 106-1 joins the separate calls. In some embodiments, the two calls are merged responsive to the each of the caller and the advertiser representative accepting the call.

In some embodiments, to make a voice connection responsive to a click-to-call selection by the user of a computing device, the telephony management system 106-1 can route a VoIP call established with the caller over the IP network(s) 104 to the advertiser representative. Accordingly, only the advertiser representative receives an inbound call. For example without limitation, a SIP request from a computing device could be reconfigured and redirected based at least in part on the phone number of the advertiser representative. A SIP request could be configured so that response messaging is routed to the computing device and/or the telephony management system 106-1. In some embodiments, the call from the caller is connected to the advertiser representative responsive to the advertiser representative accepting the call.

In various embodiments, the telephony management system 106-1 may interface with callers and/or callees using one or more suitable types of internet telephony systems, such as, for example, SIP-based internet telephony, H.323-based internet telephony, and/or the like. Accordingly, various embodiments of the telephony management system 106-1 may support multiple, different types of internet telephony systems. In some embodiments, the telephony management system 106-1 may include one or more servers and one or more controllers, which may be SIP servers and session border controllers, in order to interface with the IP network(s) 104, control messaging, and facilitate set-up, voice conversation, and tear-down of VoIP calls to or from the telephony management system 106-1. The one or more controllers could handle processing and routing of incoming requests from the computing device.

In some embodiments, one computer system implements one or more of the components of the system 106-1. Alternatively, different processes running on one or more shared computers may implement some of the components. For example without limitation, one computing module, thread, or process may implement multiple of the components. In some embodiments, special purpose data processing systems implement the one or more of the components. In some embodiments, processes running according to software instructions on general purpose data processing systems, such as general purpose personal computers or server computers, can implement the components. Thus, the implementations are not limited to particular hardware, software, or particular combinations of hardware and software.

Figure 14:
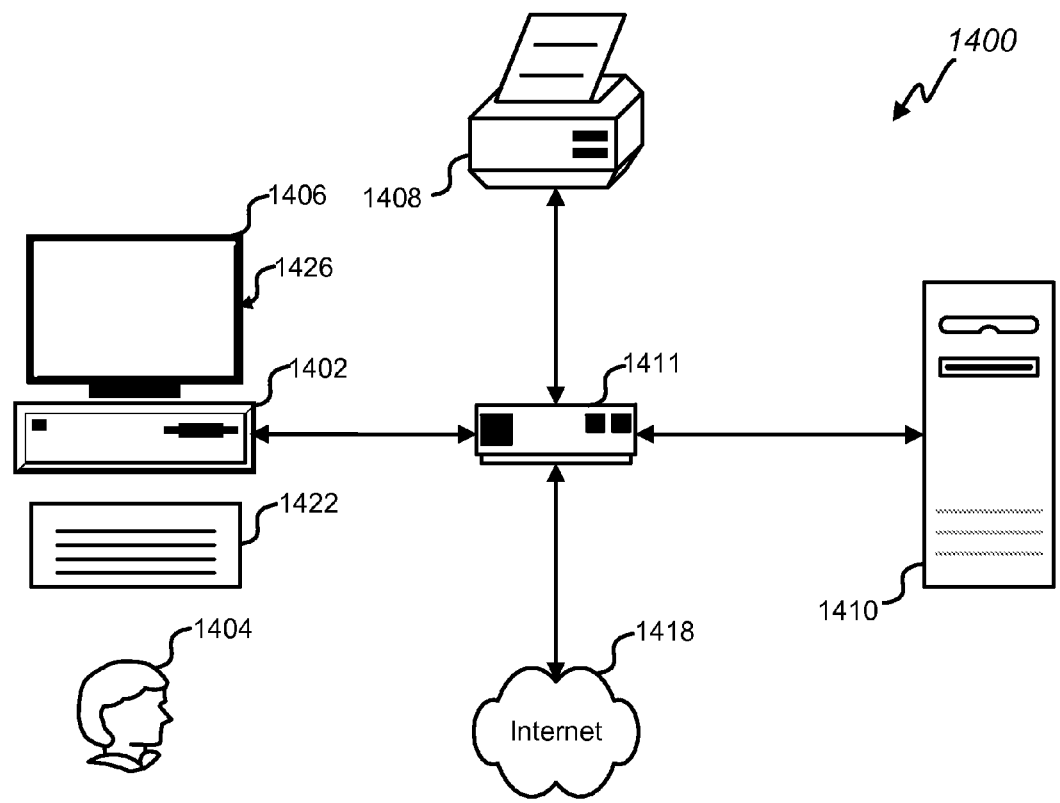
FIG. 14 depicts a block diagram of an embodiment of a computer system, in accordance with certain embodiments of the present disclosure.

Referring next to FIG. 14, an exemplary environment with which embodiments may be implemented is shown with a computer system 1400 that can be used by a designer 1404 to design, for example without limitation, electronic designs. The computer system 1400 can include a computer 1402, keyboard 1422, a network router 1412, a printer 1408, and a monitor 1406. The monitor 1406, processor 1402 and keyboard 1422 are part of a computer system 1426, which can be a laptop computer, desktop computer, handheld computer, mainframe computer, etc. The monitor 1406 can be a CRT, flat screen, etc.

A designer 1404 can input commands into the computer 1402 using various input devices, such as a mouse, keyboard 1422, track ball, touch screen, etc. If the computer system 1400 comprises a mainframe, a designer 1404 can access the computer 1402 using, for example without limitation, a terminal or terminal interface. Additionally, the computer system 1426 may be connected to a printer 1408 and a server 1410 using a network router 1412, which may connect to the Internet 1418 or a WAN.

The server 1410 may, for example without limitation, be used to store additional software programs and data. In some embodiments, software implementing the systems and methods described herein can be stored on a storage medium in the server 1410. Thus, the software can be run from the storage medium in the server 1410. In another embodiment, software implementing the systems and methods described herein can be stored on a storage medium in the computer 1402. Thus, the software can be run from the storage medium in the computer system 1426. Therefore, in this embodiment, the software can be used whether or not computer 1402 is connected to network router 1412. Printer 1408 may be connected directly to computer 1402, in which case, the computer system 1426 can print whether or not it is connected to network router 1412.

Figure 15:
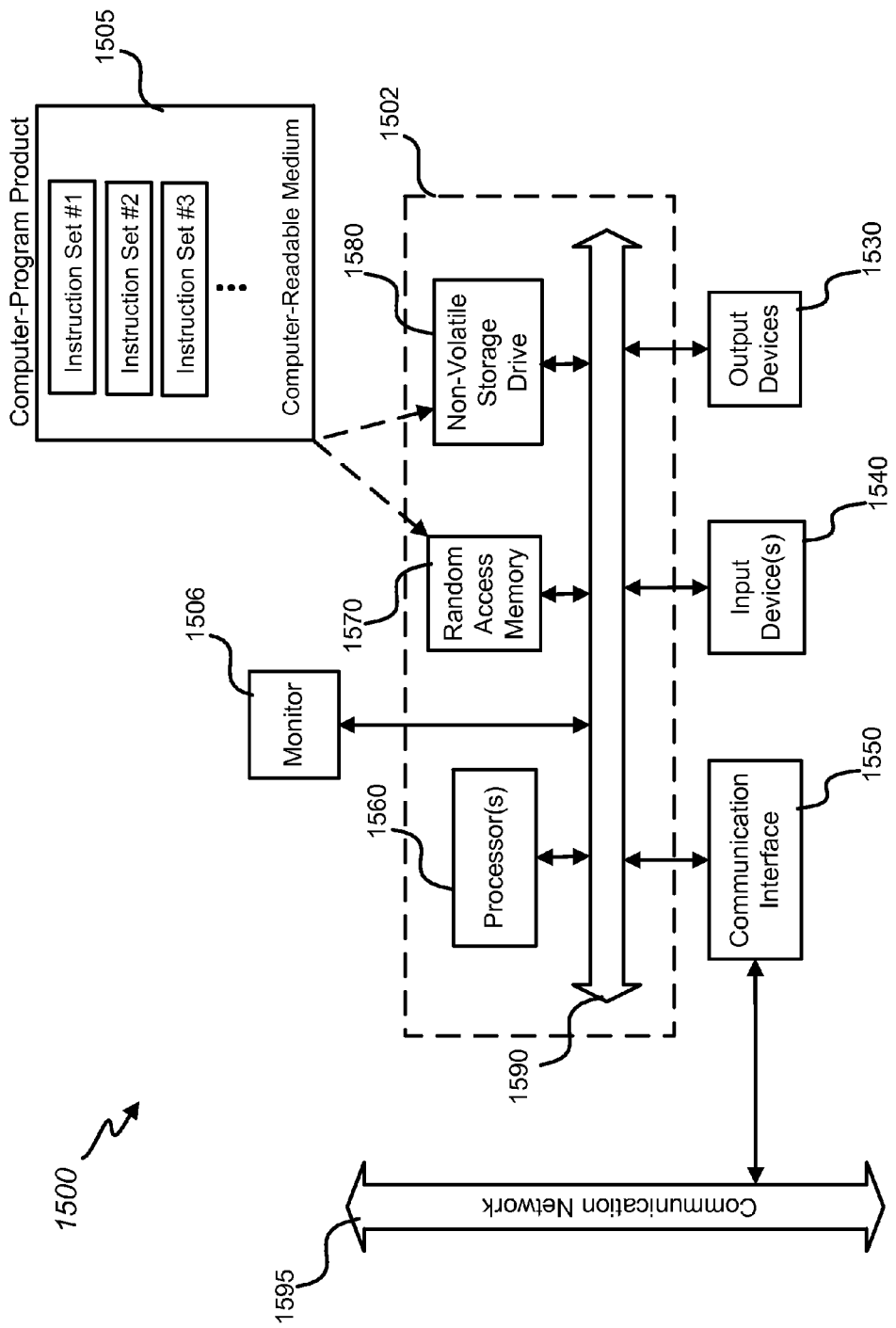
FIG. 15 depicts a block diagram of an embodiment of a special-purpose computer system, in accordance with certain embodiments of the present disclosure.

With reference to FIG. 15, an embodiment of a special-purpose computer system 1500 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1426, it is transformed into the special-purpose computer system 1500.

Special-purpose computer system 1500 comprises a computer 1502, a monitor 1506 coupled to computer 1502, one or more additional user output devices 1530 (optional) coupled to computer 1502, one or more user input devices 1540 (e.g., keyboard, mouse, track ball, touch screen) coupled to computer 1502, an optional communications interface 1550 coupled to computer 1502, a computer-program product 1505 stored in a tangible computer-readable memory in computer 1502. Computer-program product 1505 directs system 1500 to perform the above-described methods. Computer 1502 may include one or more processors 1560 that communicate with a number of peripheral devices via a bus subsystem 1590. These peripheral devices may include user output device(s) 1530, user input device(s) 1540, communications interface 1550, and a storage subsystem, such as random access memory (RAM) 1570 and non-volatile storage drive 1580 (e.g., disk drive, optical drive, solid state drive), which are forms of tangible computer-readable memory.

Computer-program product 1505 may be stored in non-volatile storage drive 1580 or another computer-readable medium accessible to computer 1502 and loaded into memory 1570. Each processor 1560 may comprise a microprocessor, such as a microprocessor from Intel® or Advanced Micro Devices, Inc.®, or the like. To support computer-program product 1505, the computer 1502 runs an operating system that handles the communications of product 1505 with the above-noted components, as well as the communications between the above-noted components in support of the computer-program product 1505. Exemplary operating systems include Windows® or the like from Microsoft® Corporation, Solaris® from Oracle®, LINUX, UNIX, and the like.

User input devices 1540 include all possible types of devices and mechanisms to input information to computer system 1502. These may include a keyboard, a keypad, a mouse, a scanner, a digital drawing pad, a touch screen incorporated into the display, audio input devices such as voice recognition systems, microphones, and other types of input devices. In various embodiments, user input devices 1540 are typically embodied as a computer mouse, a trackball, a track pad, a joystick, wireless remote, a drawing tablet, a voice command system. User input devices 1540 typically allow a user to select objects, icons, text and the like that appear on the monitor 1506 via a command such as a click of a button or the like. User output devices 1530 include all possible types of devices and mechanisms to output information from computer 1502. These may include a display (e.g., monitor 1506), printers, non-visual displays such as audio output devices, etc.

Communications interface 1550 provides an interface to other communication networks 1595 and devices and may serve as an interface to receive data from and transmit data to other systems, WANs and/or the Internet 1418. Embodiments of communications interface 1550 typically include an Ethernet card, a modem (telephone, satellite, cable, ISDN), a (asynchronous) digital subscriber line (DSL) unit, a FireWire® interface, a USB® interface, a wireless network adapter, and the like. For example without limitation, communications interface 1550 may be coupled to a computer network, to a FireWire® bus, or the like. In other embodiments, communications interface 1550 may be physically integrated on the motherboard of computer 1502, and/or may be a software program, or the like.

RAM 1570 and non-volatile storage drive 1580 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1570 and non-volatile storage drive 1580 may be configured to store the basic programming and data constructs that provide the functionality of various embodiments of the present invention, as described above.

Software instruction sets that provide the functionality of the present invention may be stored in RAM 1570 and non-volatile storage drive 1580. These instruction sets or code may be executed by the processor(s) 1560. RAM 1570 and non-volatile storage drive 1580 may also provide a repository to store data and data structures used in accordance with the present invention. RAM 1570 and non-volatile storage drive 1580 may include a number of memories including a main random access memory (RAM) to store of instructions and data during program execution and a read-only memory (ROM) in which fixed instructions are stored. RAM 1570 and non-volatile storage drive 1580 may include a file storage subsystem providing persistent (non-volatile) storage of program and/or data files. RAM 1570 and non-volatile storage drive 1580 may also include removable storage systems, such as removable flash memory.

Bus subsystem 1590 provides a mechanism to allow the various components and subsystems of computer 1502 communicate with each other as intended. Although bus subsystem 1590 is shown schematically as a single bus, alternative embodiments of the bus subsystem may utilize multiple busses or communication paths within the computer 1502.

Specific details are given in the above description to provide a thorough understanding of the embodiments. However, it is understood that the embodiments may be practiced without these specific details. For example without limitation, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example without limitation, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example without limitation, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for telephone number provisioning, comprising:
   processing, via a telephony management system, information about a first location specified for at least one of an entity and an individual;
   determining, via the telephony management system, a region of interest based at least in part on the first location;
   processing, via the telephony management system, a set of telephony information retained in a telephony information repository based at least in part on the region of interest;
   identifying, via the telephony management system, one or more rate centers corresponding to the region of interest based at least in part on the set of telephony information;
   determining, via the telephony management system, telephone number inventory with respect to a first rate center corresponding to the region of interest based at least in part on the set of telephony information;
   detecting, via the telephony management system, that telephone numbers associated with the telephone number inventory of the first rate center are unavailable;
   determining, via the telephony management system, telephone number inventory with respect to a second rate center, in response to determining that the telephone numbers associated with the telephone number inventory of the first rate center are unavailable, the telephone number inventory of the second rate center corresponding to the region of interest based at least in part on the set of telephony information, the determining the telephone number inventory comprising:
      categorizing at least some of the telephone number inventory according to availability of telephone numbers, with respect to the second rate center, to determine a first set of telephone numbers, the first set of telephone numbers being available for assignment;
   causing, via the telephony management system, indication to a user interface of:
      availability of telephone numbers, of the second rate center, for assignment within the region of interest based at least in part on the first set of telephone numbers; and
      determined local calling characteristics of the first set of telephone numbers;
   wherein the user interface presents graphical indicia that distinguishes the local calling characteristics of the first set of telephone numbers;
   identifying, via the telephony management system, one or more of the first set of telephone numbers based at least in part on a user selection; and
   assigning, via the telephony management system, the one or more of the first set of telephone numbers to at least one of the entity and the individual.

2. The method for telephone number provisioning of claim 1, wherein at least one of the entity and the individual and the information about the first location corresponds to a business.

3. The method for telephone number provisioning of claim 1, wherein the information about the first location is based at least in part on first user input responsive to a first set of one or more user-selectable options being presented via the user interface.

4. A system for telephone number provisioning, comprising:
one or more processors coupled to one or more network interfaces; and
one or more storage media coupled to the one or more processors to retain instructions, the one or more processors to execute the instructions to:
process information about a first location specified for at least one of an entity and an individual;
determine a region of interest based at least in part on the first location;
process a set of telephony information retained in a telephony information repository based at least in part on the region of interest;
identify one or more rate centers corresponding to the region of interest based at least in part on the set of telephony information;
determine telephone number inventory with respect to a first rate center corresponding to the region of interest based at least in part on the set of telephony information;
detect that telephone numbers associated with the telephone number inventory of the first rate center are unavailable;
determine telephone number inventory with respect to a second rate center, in response to determining that the telephone numbers associated with the telephone number inventory of the first rate center are unavailable, the telephone number inventory of the second rate center corresponding to the region of interest based at least in part on the set of telephony information, the determining the telephone number inventory comprising;
categorizing at least some of the telephone number inventory according to availability of telephone numbers, with respect to the second rate center, to determine a first set of telephone numbers, the first set of telephone numbers being available for assignment;
cause indication to a user interface of:
availability of telephone numbers, of the second rate center, for assignment within the region of interest based at least in part on the first set of telephone numbers; and
determined local calling characteristics of the first set of telephone numbers;
wherein the user interface presents graphical indicia that distinguishes the local calling characteristics of the first set of telephone numbers;
identify one or more of the first set of telephone numbers based at least in part on a user selection; and
assign the one or more of the first set of telephone numbers to at least one of the entity and the individual.

5. The system for telephone number provisioning of claim 4, wherein the at least one entity and the individual and the information about the first location corresponds to a business.

6. The system for telephone number provisioning of claim 4, wherein the information about the first location is based at least in part on first user input responsive to a first set of one or more user-selectable options being presented via the user interface.

7. One or more non-transitory, machine-readable media having machine-readable instructions thereon which, when executed by one or more computers or other processing devices, cause the one or more computers or other processing devices to:
process information about a first location specified for at least one of an entity and an individual;
determine a region of interest based at least in part on the first location;
process a set of telephony information retained in a telephony information repository based at least in part on the region of interest;
identify one or more rate centers corresponding to the region of interest based at least in part on the set of telephony information;
determine telephone number inventory with respect to a first rate center corresponding to the region of interest based at least in part on the set of telephony information;
detect that telephone numbers associated with the telephone number inventory of the first rate center are unavailable;
determine telephone number inventory with respect to a second rate center, in response to determining that the telephone numbers associated with the telephone number inventory of the first rate center are unavailable, the telephone number inventory of the second rate center corresponding to the region of interest based at least in part on the set of telephony information, the determining the telephone number inventory, comprising;
categorizing at least some of the telephone number inventory according to availability of telephone numbers, with respect to the second rate center, to determine a first set of telephone numbers, the first set of telephone numbers being available for assignment;
cause indication to a user interface of:
availability of telephone numbers, of the second rate center, for assignment within the region of interest based at least in part on the first set of telephone numbers; and
determined local calling characteristics of the first set of telephone numbers;
wherein the user interface presents graphical indicia that distinguishes the local calling characteristics of the first set of telephone numbers;
identify one or more of the first set of telephone numbers based at least in part on a user selection; and
assign the one or more of the first set of telephone numbers to at least one of the entity and the individual.

8. The one or more non-transitory, machine-readable media of claim 7, wherein at least one of the entity and the individual and the information about the first location corresponds to a business.

9. The one or more non-transitory, machine-readable media of claim 7, wherein the information about the first location is based at least in part on first user input responsive to a first set of one or more user-selectable options being presented via the user interface.

* * * * *